United States Patent
Kanno et al.

(10) Patent No.: US 12,321,601 B2
(45) Date of Patent: Jun. 3, 2025

(54) MEMORY SYSTEM AND METHOD OF CONTROLLING NONVOLATILE MEMORY

(71) Applicant: Kioxia Corporation, Tokyo (JP)

(72) Inventors: Shinichi Kanno, Ota (JP); Yuki Sasaki, Kamakura (JP)

(73) Assignee: Kioxia Corporation, Tokyo (JP)

( * ) Notice: Subject to any disclaimer, the term of this patent is extended or adjusted under 35 U.S.C. 154(b) by 160 days.

(21) Appl. No.: 17/931,300

(22) Filed: Sep. 12, 2022

(65) Prior Publication Data

US 2023/0244383 A1 Aug. 3, 2023

(30) Foreign Application Priority Data

Jan. 31, 2022 (JP) .................................. 2022-012900

(51) Int. Cl.
    *G06F 3/06* (2006.01)
(52) U.S. Cl.
    CPC .......... *G06F 3/0611* (2013.01); *G06F 3/0653* (2013.01); *G06F 3/0679* (2013.01)
(58) Field of Classification Search
    CPC ..... G06F 3/0611; G06F 3/0653; G06F 3/0679
    USPC ....................................................... 711/103
    See application file for complete search history.

(56) References Cited

U.S. PATENT DOCUMENTS

| | | | |
|---|---|---|---|
| 8,468,318 B2 | 6/2013 | Colgrove et al. | |
| 10,114,553 B2 | 10/2018 | Li et al. | |
| 10,592,171 B2 | 3/2020 | Huen et al. | |
| 10,643,711 B1* | 5/2020 | Yuan | G11C 16/32 |
| 2013/0205085 A1* | 8/2013 | Hyun | G06F 3/0679 710/5 |
| 2017/0285969 A1* | 10/2017 | Madraswala | G06F 3/0659 |
| 2021/0124497 A1* | 4/2021 | Bert | G06F 3/0611 |
| 2023/0214147 A1* | 7/2023 | Chodem | G06F 3/0679 711/164 |

FOREIGN PATENT DOCUMENTS

| | | |
|---|---|---|
| JP | 5937598 B2 | 6/2016 |
| JP | 6240309 B2 | 11/2017 |

* cited by examiner

*Primary Examiner* — Gautam Sain
(74) *Attorney, Agent, or Firm* — Oblon, McClelland, Maier & Neustadt, L.L.P.

(57) ABSTRACT

According to one embodiment, when a command being executed in a nonvolatile memory is an erase/program command and either a first condition or a second condition is satisfied, a memory system suspends an execution of the erase/program command by transmitting a suspend command to the nonvolatile memory. The first condition is that either the number of read commands included in the first command group or a sum of weights associated with the read commands is equal to or greater than a first value. The second condition is that one or more read commands are included in the first command group and a time elapsed from when an execution of the erase/program command is started or resumed becomes equal to or greater than a second value.

20 Claims, 16 Drawing Sheets

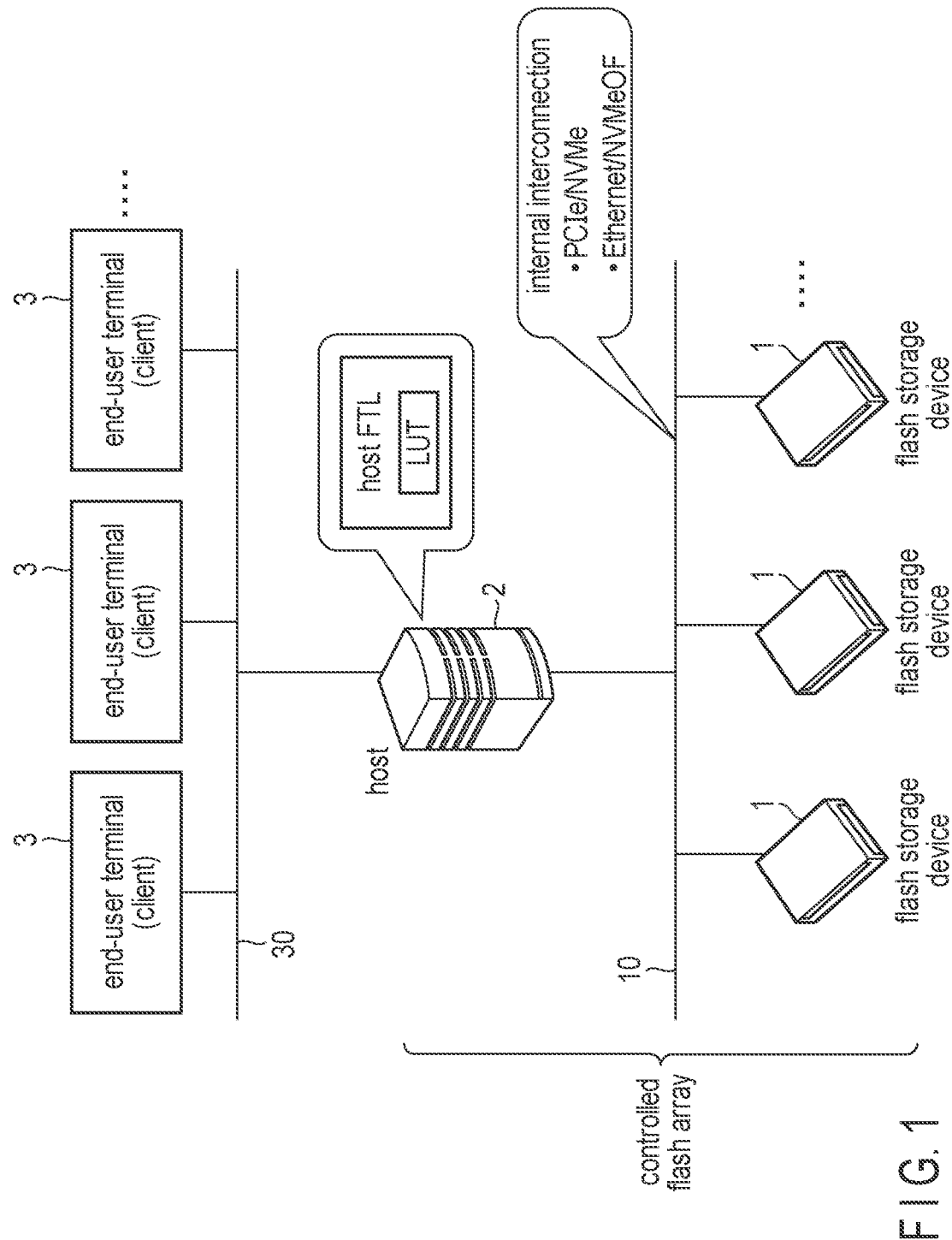
F I G. 1

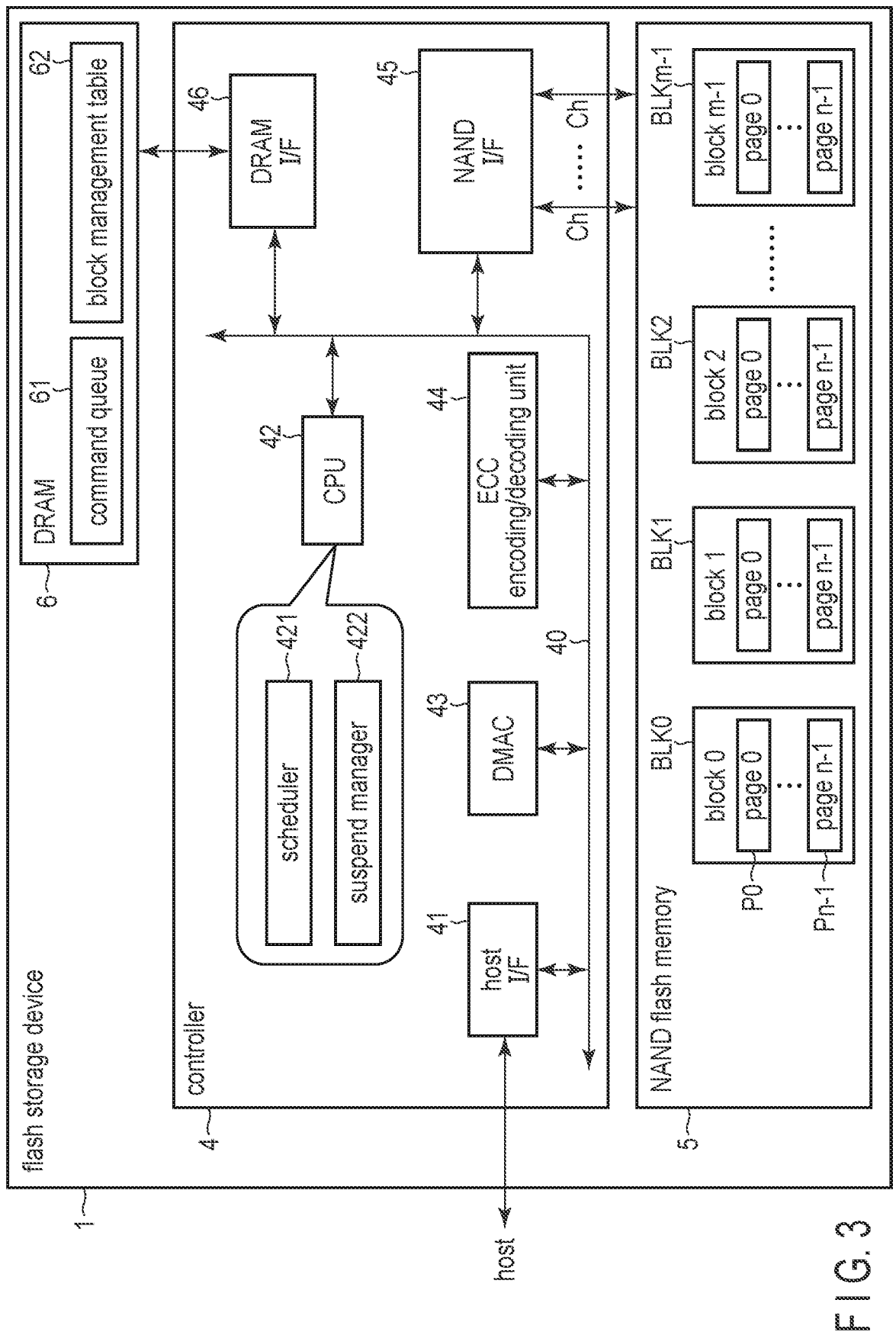
F I G. 3

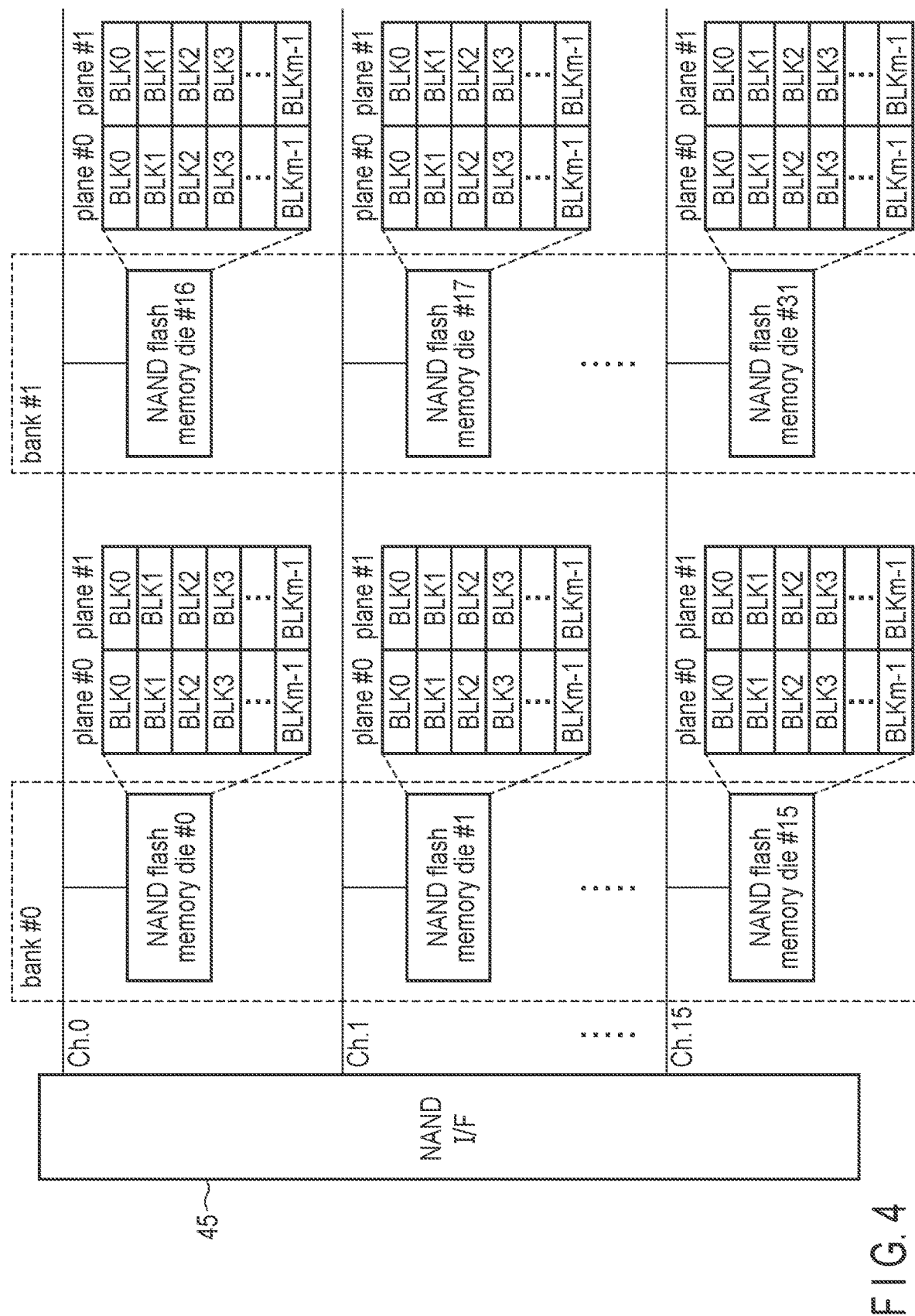
F I G. 4

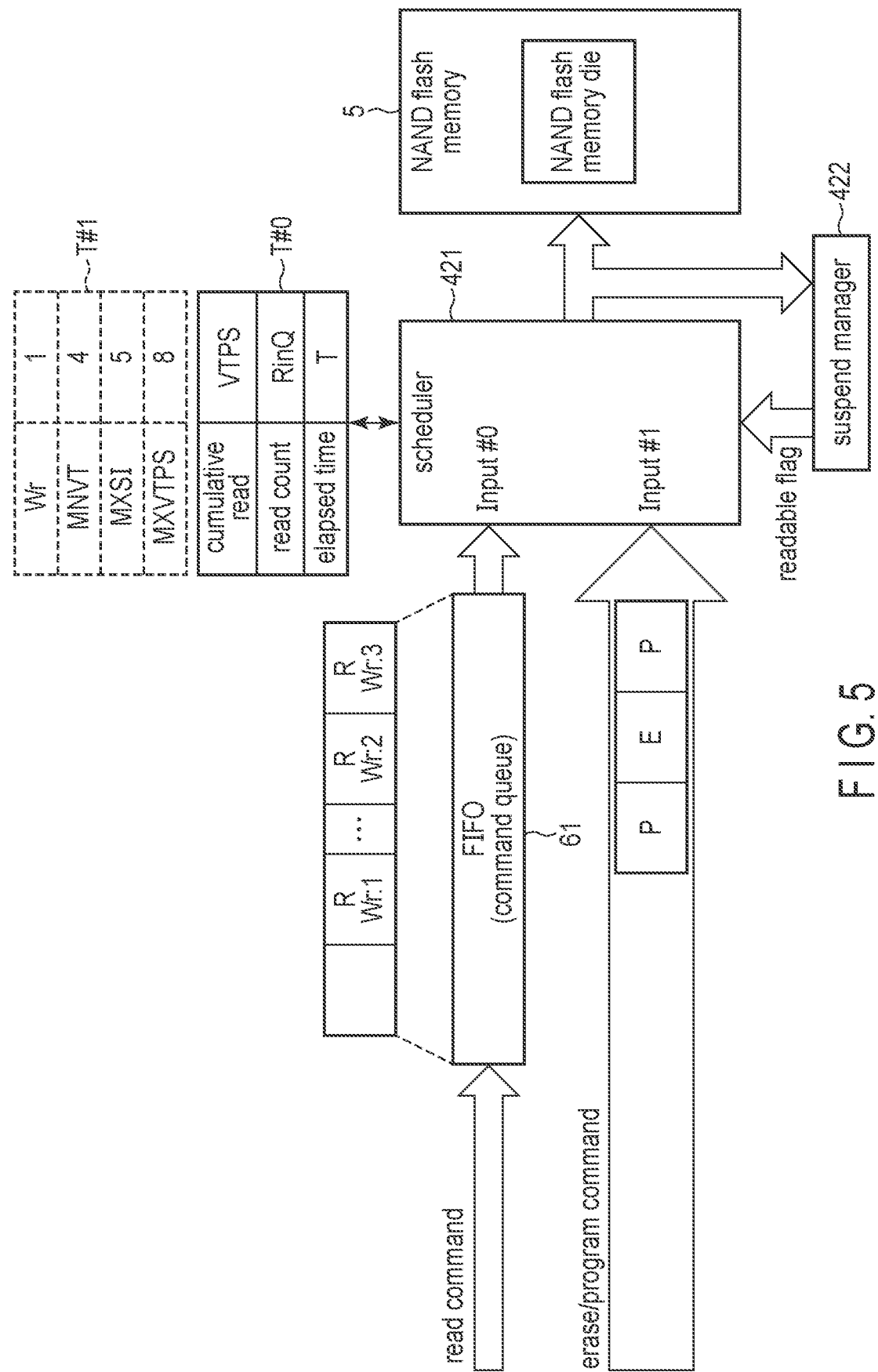
F I G. 5

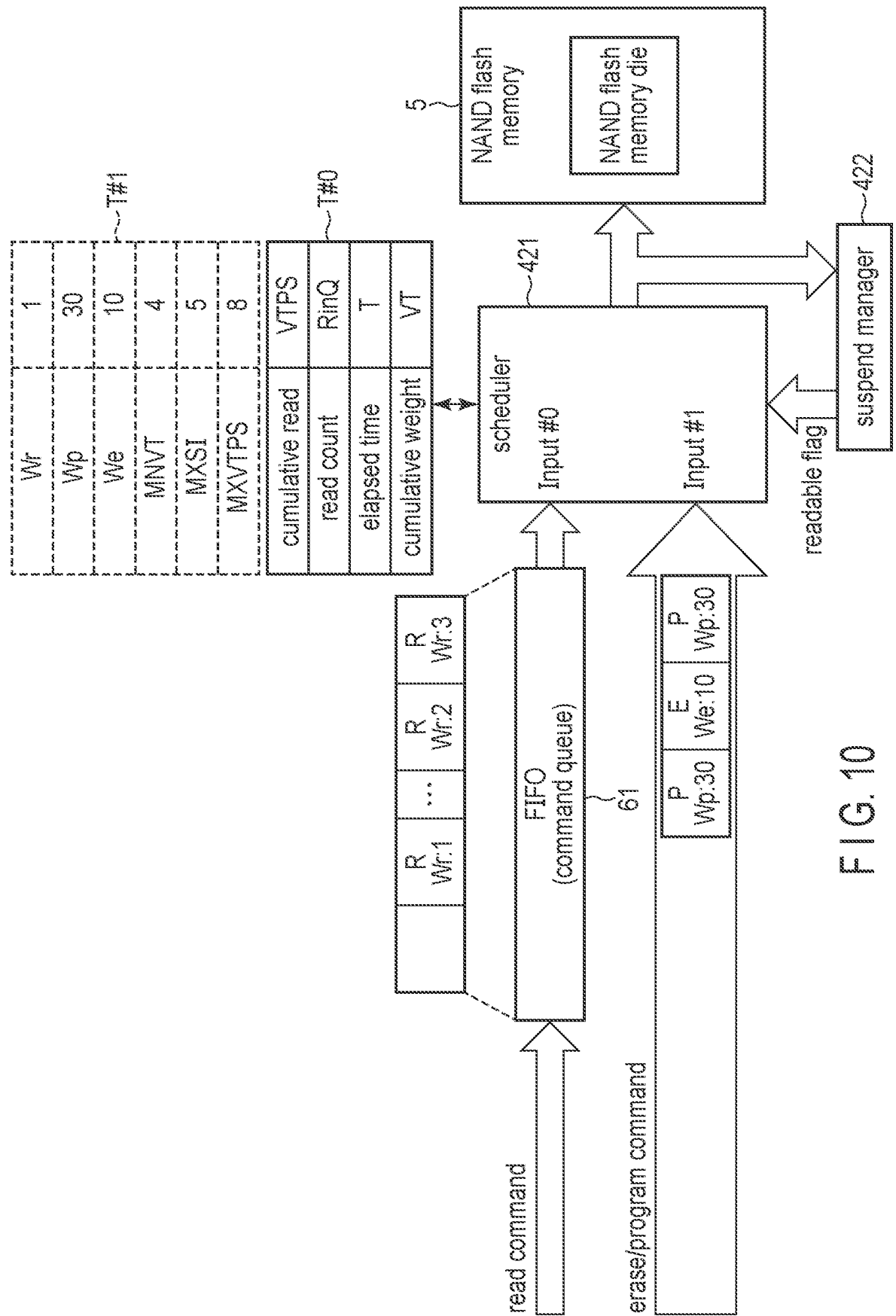
F I G. 10

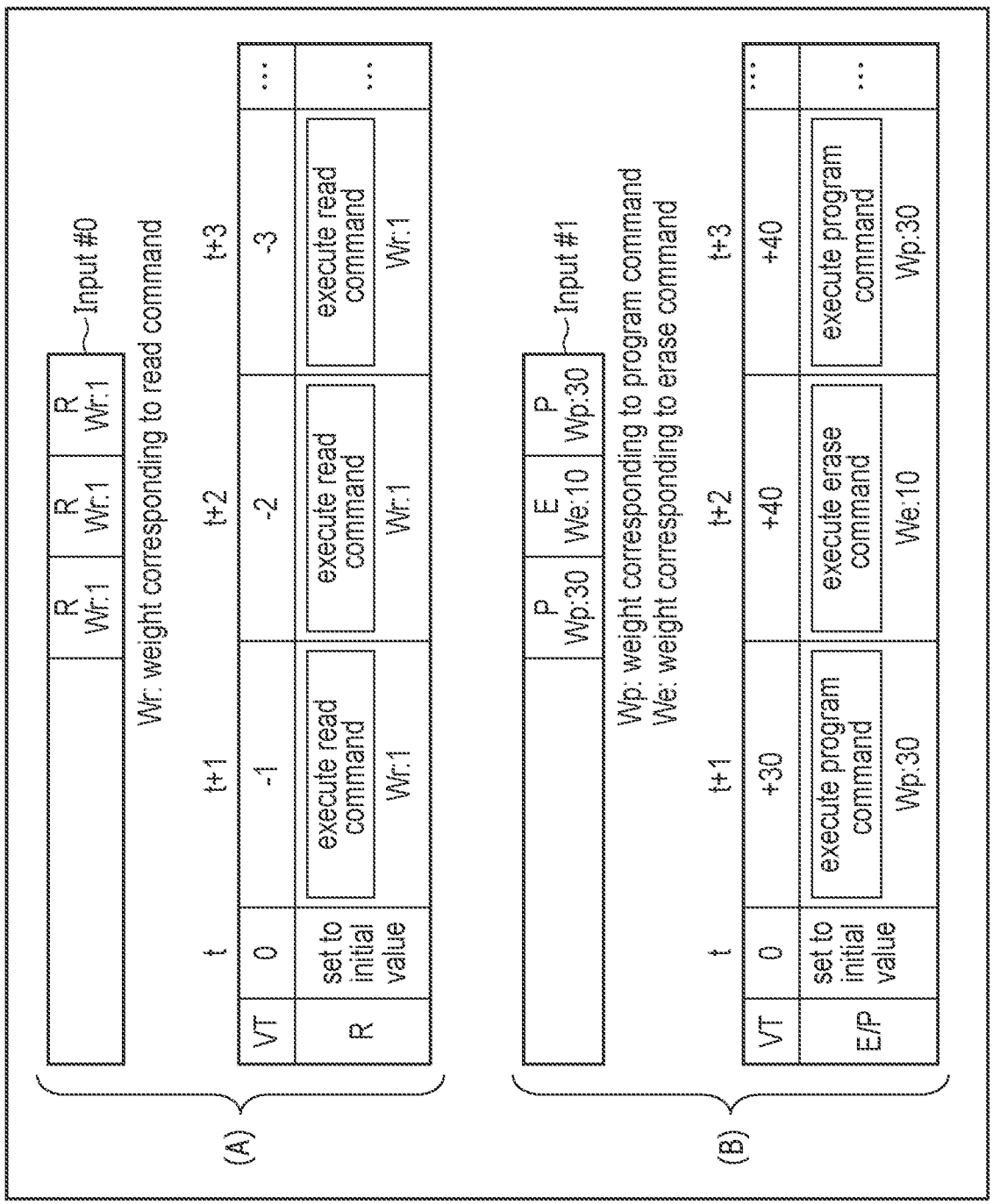
F I G. 11

When program command is executed after executing read commands

| | t | t+1 | t+2 | t+3 | t+4 | ... |
|---|---|---|---|---|---|---|
| VT | 0 | -1 | -2 | +28 | +27 | ... |
| R | set to initial value | execute read command<br>Wr:1 | execute read command<br>Wr:1 | — | execute read command<br>Wr:1 | ... |
| E/P | set to initial value | — | — | execute program command<br>Wp:30 | — | ... |

F I G. 13

MEMORY SYSTEM AND METHOD OF CONTROLLING NONVOLATILE MEMORY

CROSS-REFERENCE TO RELATED APPLICATIONS

This application is based upon and claims the benefit of priority from Japanese Patent Application No. 2022-012900, filed Jan. 31, 2022, the entire contents of which are incorporated herein by reference.

FIELD

Embodiments described herein relate generally to a technology for controlling a nonvolatile memory.

BACKGROUND

In recent years, memory systems implemented with a nonvolatile memory have been widely used. As one of such memory systems, a solid state drive (SSD) implemented with a NAND flash memory has been known.

SSDs are used as a storage device in various types of host computing systems, such as a server in a data center.

For a storage device such as an SSD, there has been a demand for an implementation of a new technology for enabling flexible control of accesses to the nonvolatile memory.

BRIEF DESCRIPTION OF THE DRAWINGS

FIG. 1 is a block diagram illustrating a relationship between a memory system according to an embodiment and a host.

FIG. 3 is a block diagram illustrating an example of a configuration of the memory system according to the embodiment.

FIG. 4 is a block diagram illustrating a relation between a plurality of channels and a plurality of NAND flash memory dies used in the memory system according to the embodiment.

FIG. 5 is a diagram illustrating a scheduler that performs a scheduling operation in the memory system according to the embodiment.

FIG. 10 is a diagram illustrating a scheduler that executes a scheduling operation using a cumulative weight in the memory system according to the embodiment.

FIG. 11 is a diagram illustrating a virtual time (VT) updating operation performed when an execution of a read command in a first input (input #0) of the scheduler is started, and the VT updating operation performed when an execution of an erase/program command in a second input (input #1) of the scheduler is started.

FIG. 13 is a diagram illustrating an operation for executing a program command in the input #1 after executing a read command in the input #0.

DETAILED DESCRIPTION

Figure 2:
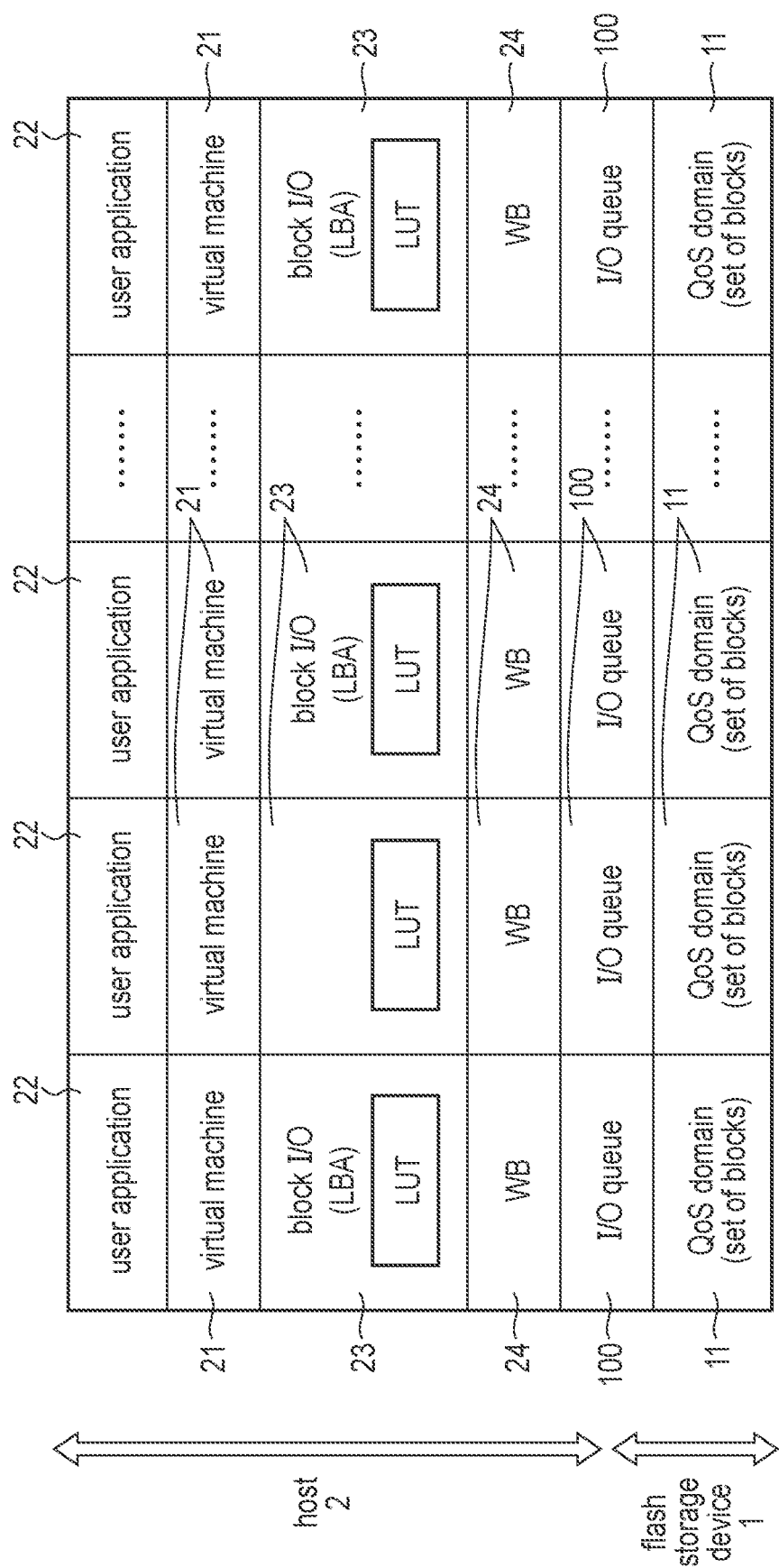
FIG. 2 is a diagram for explaining responsibilities shared between the memory system according to the embodiment and the host.

Various embodiments will be described hereinafter with reference to the accompanying drawings.

In general, according to one embodiment, a memory system is connectable to a host. The memory system comprises a nonvolatile memory, and a controller electrically connected to the nonvolatile memory. The controller is configured to receive a first command group including a read command to be sent to the nonvolatile memory, and a second command group including at least one of an erase command to be sent to the nonvolatile memory and a program command to be sent to the nonvolatile memory, select a command group a command of which is to be executed, from the first command group and the second command group, and start executing a command included in the selected command group.

When a command being executed in the nonvolatile memory is an erase/program command and either a first condition or a second condition is satisfied, the controller suspends an execution of the erase/program command by transmitting a suspend command to the nonvolatile memory. The first condition is that either the number of read commands included in the first command group or a sum of weights associated with the read commands included in the first command group is equal to or greater than a first value. The second condition is that one or more read commands are included in the first command group and a time elapsed from when an execution of the erase/program command is started or resumed becomes equal to or greater than a second value.

The controller resumes the execution of the suspended erase/program command after repeating an operation of starting an execution of a read command included in the first command group until: there is no more read command in the first command group or either the number of read commands executed during the suspension triggered by the suspend command or a sum of the weights associated with the read commands executed during the suspension becomes equal to or greater than a third value.

To begin with, a relation between a memory system according to the embodiment and a host will be explained with reference to FIG. 1.

This memory system is a semiconductor storage device configured to write data to a nonvolatile memory, and to read data from the nonvolatile memory. The memory system is implemented as flash storage devices 1 that includes a NAND flash memory.

The flash storage devices 1 may be connected to a host 2 via a cable or a network.

The host (host device) 2 is configured to control a plurality of flash storage devices 1. The host 2 is implemented as an information processing apparatus configured to use a flash array including the plurality of flash storage devices 1 as a storage. The information processing apparatus may be a personal computer or a server computer.

A configuration in which an information processing apparatus, such as a server computer, functions as the host 2 will be explained as an example.

The host (server) 2 and the plurality of flash storage devices 1 are interconnected via an interface 10 (internal interconnection). As the interface 10 for this interconnection, PCI Express (PCIe) (registered trademark), NVM Express (NVMe) (registered trademark), Ethernet (registered trademark), NVMe over Fabrics (NVMeOF), or the like may be used, without limitation thereto.

A typical example of the server computer functioning as the host 2 is a server computer in a data center (hereinafter, referred to as a server).

In the example in which the host 2 is implemented as a server in a data center, the host (server) 2 may be connected to a plurality of end-user terminals (clients) 3 via a network 30. The host 2 is capable of providing various services to these end-user terminals 3.

Examples of the services the host (server) 2 is capable of providing include (1) a Platform as a Service (PaaS) that provides a system operation platform to the clients (the end-user terminals 3), and (2) an Infrastructure as a Service (IaaS) that provides an infrastructure such as a virtual server to the clients (the end-user terminal 3).

A plurality of virtual machines may be executed on a physical server which functions as the host (server) 2. Each of these virtual machines running on the host (server) 2 can function as a virtual server configured to provide various services to a client (end-user terminal 3) corresponding to that virtual machine. An operating system and a user application that are used by the end-user terminal 3 corresponding to this virtual machine are executed in each of the virtual machines.

A flash translation layer (host FTL) is also executed in the host (server) 2. The host FTL includes a lookup table (LUT) that is an address translation table for managing the mapping between each of data identifiers (tags) for identifying data to be accessed and each of physical addresses of the nonvolatile memories in the flash storage devices 1. The host FTL can recognize data placement on the nonvolatile memory in the flash storage device 1 by using the LUT.

The flash storage device 1 includes a nonvolatile memory such as a NAND flash memory. The nonvolatile memory includes a plurality of blocks each including a plurality of pages. Each of these blocks is a unit of a data erase operation for erasing data. The data erasing operation is also referred to as "erasing operation" or "block erase". Each of the pages included in each of the blocks is a unit of a data write operation for writing data to the nonvolatile memory and a data read operation for reading data from the nonvolatile memory.

Each of the flash storage devices 1 can execute low-level abstraction. The low-level abstraction is a function for abstracting a nonvolatile memory. The low-level abstraction includes functions such as a function for assisting data placement. Examples of the function for assisting data placement include an allocation function for allocating a write destination block to which user data from the host 2 is to be written, a function for determining a write destination location to which the user data is to be written (the write destination block and the location within the write destination block), a function for notifying an upper layer (host 2) of the physical address (the block address and the offset in the block) indicating the write destination location where the user data has been written.

The block address is a block identifier for identifying each of the blocks included in a nonvolatile memory. When the nonvolatile memory includes a plurality of nonvolatile memory dies, the block address is represented as a combination of a die identifier and a block address. Alternatively, when each of the nonvolatile memory dies includes a plurality of planes, a block address is represented by a combination of a die identifier, a plane identifier, and a block address.

The examples of the function for assisting data placement may also include a function for allocating a copy destination block to which user data already written in the nonvolatile memory is to be copied, a function for determining a copy destination location to which the user data is to be copied (the destination block and the location within the destination block to be copied), a function for notifying the upper layer (host 2) of the physical address (the block address and the offset in the block) indicating the copy destination location to which the user data has been copied.

Each of the flash storage devices 1 executes various commands received from the host 2. These commands include a write command for writing data to the nonvolatile memory in the flash storage device 1, a read command for reading data from the nonvolatile memory, and a copy command for copying data already written in the nonvolatile memory to another storage location in the nonvolatile memory.

FIG. 2 is a diagram illustrating the responsibilities shared between the flash storage device 1 and the host 2.

In the host (server) 2, a plurality of virtual machines 21 respectively corresponding to a plurality of end users are executed. In each of the virtual machines 21, an operating system and a user application 22 used by the corresponding end user are executed.

In the host (server) 2, a plurality of I/O services 23 respectively corresponding to a plurality of user applications 22 are executed. Each of these I/O services 23 may include a logical block address (LBA)-based block I/O service and a key-value store service, for example. Each of these I/O services 23 includes a lookup table (LUT) for managing mapping between each of tags and each of physical addresses in the flash storage device 1.

The tag herein means a data identifier for identifying data to be accessed. For example, a logical address such as a logical block address (LBA) is used as a tag. Alternatively, a user address (e.g., a key of a key-value store, or a hash value of the key) may be used as a tag.

The physical address of the flash storage device 1 is an address for specifying a physical storage location in the nonvolatile memory included in the flash storage device 1.

In the LBA-based block I/O service, an LUT for managing the mapping between each of logical addresses (LBAs) and each of physical addresses of the flash storage device 1 may be used.

In a key-value store service, an LUT for managing the mapping among each of keys (hash values of the keys), each of the physical addresses of the flash storage devices 1 storing the data corresponding to these keys, and each of data lengths of the data corresponding to the keys, may be used.

Each of the end users can select an addressing method (LBA, the key of the key-value store, the hash value of the key, or the like) to be used.

The host (server) 2 manages a plurality of write buffers (WB) 24 corresponding to the respective virtual machines 21. A piece of data from a certain user application 22 is temporarily stored in the write buffer (WB) 24 allocated to the virtual machine 21 corresponding to the user application 22.

Transmissions of commands from the host (server) 2 to the flash storage device 1 and returns of command completion responses or the like from the flash storage device 1 to the host (server) 2 are carried out via the I/O queue 100 provided on each of the host (server) 2 and the flash storage devices 1.

The flash storage device 1 manages a plurality of region obtained by logically dividing the nonvolatile memory in the flash storage device 1, as a QoS domain 11. Each of these QoS domains 11 is a subset of a plurality of blocks included in the nonvolatile memory. Each of the blocks included in the nonvolatile memory belongs only to one of the QoS domains 11, and the same block does not belong to different QoS domains 11 at the same time.

Each of these QoS domains 11 is identified by an identifier referred to as a QoS domain ID. These QoS domain IDs are used as identifiers for making an access to these regions (QoS domains).

In this embodiment, each write command (write request) issued from the host 2 specifies, for example, a QoS domain ID, a tag for write data (e.g., the LBA corresponding to the write data), a length of the write data, and a buffer address indicating a location in the memory of the host 2 where the write data is stored. Hereinafter, the memory in the host 2 is also simply referred to as a host memory.

When a write command is received from the host 2, the flash storage device 1 selects one of the free blocks in the QoS domain corresponding to the QoS domain ID specified in the write command, applies an erase operation (data erase operation) to the selected free block, and allocates the free block applied with the erase operation as a new write destination block for the QoS domain.

The write destination block herein means a block to which data is to be written. When a write destination block has already been allocated for the QoS domain, it is not necessary to execute this process of allocating a new write destination block for the QoS domain.

The flash storage device 1 acquires the write data associated with the write command received from the host 2, from the host memory, and writes the acquired write data to the write destination block having been newly allocated for this QoS domain (or the write destination block already allocated for this QoS domain).

At this time, the flash storage device 1 writes the write data received from the host 2, as well as the tag of the write data (e.g., the LBA corresponding to the write data), to the write destination block.

Once the write data associated with the received write command is written to the write destination block, the flash storage device 1 transmits the tag of the data, the length of the data, and the physical address (the block address and the offset in the block) indicating the physical storage location to which the data has been written, to the host 2, as an address recording request. The address recording request is used as a physical address notification message for notifying the host 2 of the physical address indicating the physical storage location where the data has been written.

In response to the reception of the address recording request from the flash storage device 1, the host 2 updates the LUT (logical-to-physical address conversion table) of the host 2 such that this physical address is associated with a tag such as an LBA corresponding to this data.

The host 2 can manage whether the data stored in each physical storage location of the nonvolatile memory in the flash storage device 1 is valid data or invalid data using the LUT. The valid data herein means the latest data associated with a tag such as an LBA. In other words, the data linked from the LUT (logical-to-physical address conversion table) in the host 2 as the latest data is valid data. In addition, invalid data means data that is not associated with a tag such as an LBA. Data not linked from the LUT in the host 2 is invalid data. For example, when update data corresponding to a certain LBA has been written to the flash storage device 1, previous data corresponding to this LBA becomes invalid data.

Each read command (read request) issued from the host 2 specifies, for example, a physical address (block address and the offset in the block) indicating the physical storage location where the read target data is stored, the length of the read target data, and the buffer address indicating the location in the host memory to which the read target data is to be transferred.

When a read command is received from the host 2, the flash storage device 1 reads the read target data from the physical storage location in the nonvolatile memory, the location being indicated by the physical address specified in the received read command, and transfers the read target data to the location in the host memory, the location being indicated by the buffer address specified in the received read command.

Each copy command (copy request) issued from the host 2 indicates, for example, a physical address indicating a copy source block (that is, the block address of the copy source block), a physical address indicating a copy destination block (that is, the block address of the copy destination block), and a valid bitmap corresponding to the copy source block.

A valid bitmap includes a plurality of bits respectively corresponding to a plurality of physical storage locations within the copy source block. Each of the bits indicates whether there is valid data in the physical storage location corresponding to that bit. In other words, the valid bitmap indicates whether each of data stored in the copy source block is valid data or invalid data.

In response to receiving the copy command from the host 2, the flash storage device 1 identifies each of valid data stored in the copy source block based on the valid bitmap, and copies each valid data stored in the copy source block to the copy destination block. In this case, the flash storage device 1 copies each valid data stored in the copy source block to the copy destination block, together with the tag corresponding to each valid data (e.g., the LBA corresponding to each valid data).

The flash storage device 1 transmits, for example, an address change request specifying a tag (for example, the LBA) of each of the copied valid data, a length of each of the copied valid data, a physical copy source address of the valid data, and the copy destination physical address of each of the copied valid data, to the host 2.

FIG. 3 illustrates a configuration example of the flash storage device 1.

The flash storage device 1 includes a controller 4 and a nonvolatile memory (for example, a NAND flash memory 5). The flash storage device 1 also includes a random-access memory such as a DRAM 6.

The controller 4 is electrically connected to the NAND flash memory 5, which is a nonvolatile memory, via a NAND interface 45 such as a Toggle NAND Flash Interface or an Open NAND Flash Interface (ONFI). The controller 4 operates as a memory controller configured to control the NAND flash memory 5. The controller 4 may be implemented as a circuit such as a system-on-a-chip (SoC).

The NAND flash memory 5 includes a memory cell array including a plurality of memory cells arranged in a matrix. The NAND flash memory 5 may be a flash memory having a two-dimensional structure or a flash memory having a three-dimensional structure.

The memory cell array in the NAND flash memory 5 includes a plurality of blocks BLK0 to BLKm−1. Each of the blocks BLK0 to BLKm−1 includes a plurality of pages (in this example, pages P0 to Pn−1). Each of the blocks BLK0 to BLKm−1 functions as a unit for a data erase operation of erasing data. The block may also be referred to as an "erase block", a "physical block", or a "physical erase block". Each of the pages P0 to Pn−1 is a unit for a data write operation of writing data and a data read operation of reading data.

The DRAM 6 is a volatile semiconductor memory. The DRAM 6 is used for temporarily storing therein data to be written to the NAND flash memory 5, for example. The memory area in the DRAM 6 is used in storing therein various types of management data that are used by the controller 4.

A configuration of the controller 4 will be explained in detail.

The controller 4 includes a host interface (I/F) 41, a CPU 42, a direct memory access controller (DMAC) 43, an error correction code (ECC) encoding/decoding unit 44, a NAND interface (I/F) 45, and a DRAM interface (I/F) 46. The host interface 41, the CPU 42, the DMAC 43, the ECC encoding/decoding unit 44, the NAND interface 45, and the DRAM interface 46 are connected to one another via a bus 40.

The host interface 41 is a host interface circuit for communicating with the host 2. An example of the host interface 41 is a PCIe controller. Alternatively, in a configuration in which the flash storage device 1 is connected to the host 2 via Ethernet (registered trademark), the host interface 41 may be an NVMe over Fabrics (NVMeOF) controller. The host interface 41 receives various types of commands from the host 2. These commands include a write command, a read command, and a copy command.

The CPU 42 is a processor. The CPU 42 controls the host interface 41, the DMAC 43, the ECC encoding/decoding unit 44, the NAND interface 45, and the DRAM interface 46. The CPU 42 loads a control program (firmware) from the NAND flash memory 5 or a ROM (not illustrated) onto the DRAM 6, when power is supplied to the flash storage device 1.

The DMAC 43 is a circuit that performs a direct memory access (DMA). The DMAC 43 transfers data between the DRAM 6 and a memory (not illustrated) in the host 2, under the control of the CPU 42.

When data is to be written to the NAND flash memory 5, the ECC encoding/decoding unit 44 adds an error correction code (ECC) to the data as a redundant code, by encoding the data. When data is read from the NAND flash memory 5, the ECC encoding/decoding unit 44 performs error correction for the read data, using the ECC added to the read data.

The NAND interface 45 is a memory interface circuit that controls a plurality of nonvolatile memory dies. The NAND interface 45 controls the NAND flash memory 5 under the control of the CPU 42. The NAND interface 45 is connected to the NAND flash memory dies via a plurality of respective channels (Ch), for example. The communication between the NAND interface 45 and the NAND flash memory 5 is performed according to the Toggle NAND Flash Interface or the Open NAND Flash Interface (ONFI), for example.

The DRAM interface 46 is a DRAM interface circuit that controls the DRAM 6. The DRAM interface 46 controls the DRAM 6 under the control of the CPU 42.

A configuration example of the DRAM 6 will be explained. A part of the memory area in the DRAM 6 is used for storing a command queue 61 and a block management table 62.

The command queue 61 is a queue storing therein one or more commands to be transmitted to the NAND flash memory 5. The command queue 61 may be implemented as a first-in first-out (FIFO) buffer, for example. The command queue 61 may ensure different queues for respective types of commands. For example, the command queue 61 is a queue for storing therein read commands.

The block management table 62 includes a plurality of management tables respectively corresponding to a plurality of blocks in the NAND flash memory 5. Each of the management tables is used for storing management information (metadata) for managing the block corresponding to that management table. The metadata may include the number of times the corresponding block has been rewritten (the number of program/erase cycles), and an open/closed state, for example, without limitation thereto. The open/closed state indicates whether this block is in an open state or a closed state. The open state indicates a state in which this block is being used as a write destination block. The closed state indicates a state in which this block is managed as an active block filled with data.

A functional configuration example of the CPU 42 will be explained. The CPU 42 includes a scheduler 421 and a suspend manager 422. A part or the whole of the scheduler 421 and the suspend manager 422 may be controlled by firmware, or may also be implemented by dedicated hardware in the controller 4.

The scheduler 421 receives a plurality of commands for access to the NAND flash memory 5, and performs a scheduling operation of determining a command to be sent to the NAND flash memory 5, of these commands.

The accesses to the NAND flash memory 5 include a write operation (program operation) for writing data in the NAND flash memory 5, a read operation for reading data from the NAND flash memory 5, and a data erase operation for erasing data already written in the NAND flash memory 5, in units of a block.

Therefore, the commands to be sent to the NAND flash memory 5 in order to access the NAND flash memory 5 are generally classified into erase commands, program commands, and read commands.

To control scheduling operations, the scheduler 421 manages a cumulative weight. The cumulative weight is a parameter used in determining priorities between a read command (first command group) input to a first input of the scheduler 421, and an erase command and a program command (second command group) input to a second input of the scheduler 421. The cumulative weight is updated using the weight associated with each command the execution of which has been started.

Based on the cumulative weight, the scheduler 421 selects an input from which a command is to be executed, from the first input and the second input. The scheduler 421 executes a command which is input to the selected input.

The execution of a command herein is indicative of transmitting a command sequence for executing the operation corresponding to this command to the NAND flash memory 5 and thereby causing the NAND flash memory 5 to execute the operation corresponding to this command.

The suspend manager 422 monitors the number of times or the total length of time by which the execution of an erase/program command has been suspended, based on the command sequence output from the scheduler 421 to the NAND flash memory 5. When the command being executed in the NAND flash memory 5 is an erase command or a program command, and the total number of times or the total length of time by which the erase command or the program command being executed has been suspended is smaller than an upper limit value, the suspend manager 422 gives a permission to execute a suspending operation for suspending the erase command or the program command being executed, to the scheduler 421.

The suspending operation is an operation for suspending the execution of an erase/program command being executed in the NAND flash memory 5, and starting executing a read command included in the first command group instead.

If a certain condition is satisfied while an erase/program command is being executed, the scheduler 421 issues a suspend command to suspend the execution of the erase/program command. If another condition is then satisfied while the erase/program command is being suspended, the scheduler 421 issues a resume command to resume the erase/program command being suspended.

A relation between a plurality of channels and a plurality of NAND flash memory dies will be explained. FIG. 4 is a block diagram illustrating an example of a relation between a plurality of channels and a plurality of NAND flash memory dies used in the memory system according to the embodiment.

As illustrated in FIG. 4, the NAND flash memory 5 may include a plurality of NAND flash memory dies (NAND flash memory chips). Each of the NAND flash memory dies is independently operable. Therefore, the NAND flash memory dies function as a unit capable of operating in parallel. FIG. 4 illustrates an example in which 16 channels Ch.0 to Ch.15 are connected to the NAND interface 45, and two NAND flash memory dies are connected to each of the 16 channels Ch.0 to Ch.15.

In this configuration, the 16 NAND flash memory dies #0 to #15 connected to the channels Ch.0 to Ch.15 may be organized as a bank #0, and the remaining 16 NAND flash memory dies #16 to #31 connected to the channels Ch.0 to Ch.15 may be organized as a bank #1.

Each of these banks functions as a unit for causing the memory dies to operate in parallel using bank interleaving. In the configuration example illustrated in FIG. 4, it is possible to cause up to 32 NAND flash memory dies to operate in parallel, by 16 channels and the bank interleaving using two banks.

The data erasing operation and the block allocating operation are executed in units of one block. In this case, one block may be one physical block, or may be one block group including a set of a plurality of physical blocks capable of operating in parallel. The block group is also referred to as a super block.

One block group, that is, one super block including a set of a plurality of physical blocks is not limited thereto, but may include 32 physical blocks in total, selected one by one from the NAND flash memory dies #0 to #31. Note that each of the NAND flash memory dies #0 to #31 may have a multi-plane configuration. For example, when each of the NAND flash memory dies #0 to #31 has a multi-plane configuration including two planes (plane #0, plane #1), the planes included in the NAND flash memory 5 is 64 in total. One super block may include 64 physical blocks in total, selected one by one from the 64 planes included in the NAND flash memory 5.

In the operation for writing data to one super block, data write operations to the respective NAND flash memory dies #0 to #31 are executed in parallel. As a result, it is possible to execute operations for writing write data corresponding to 32 pages (write data for 64 pages in a multiplane configuration including the plane #0 and the plane #1) to the respective NAND flash memory dies #1 to #32 included the NAND flash memory 5, in parallel, for example.

A scheduling operation will be explained. FIG. 5 is a diagram illustrating a scheduler 421 that performs a scheduling operation in the memory system according to the embodiment.

In the controller 4, each write command received from the host 2 is sent to the scheduler 421, as a program command to be sent to the NAND flash memory 5. Each read command received from the host 2 is sent to the scheduler 421, as a read command to be sent to the NAND flash memory 5.

The controller 4 also generates a read command and a program command for executing a data read operation and a data write operation that correspond to each copy command received from the host 2. These read command and program command generated by the controller 4 are also sent to the scheduler 421, as a read command and a program command, respectively, to be sent to the NAND flash memory 5.

For a garbage collection operation, the controller 4 generates a read command and a program command.

In the operation for allocating a write destination block, the controller 4 generates an erase command for executing an erase operation on a free block. The erase command generated by the controller 4 is sent to the scheduler 421, as an erase command to be sent to the NAND flash memory 5.

This erase command is used for executing an erase operation for erasing data in units of a block. A program command is used for writing a piece of write data received from the host 2, or for writing a piece of copy target data specified by a copy command from the host 2, to the NAND flash memory 5. The program command is also used in a garbage collection operation to write a piece of data read from a copy source block in the NAND flash memory 5 to a copy destination block in the NAND flash memory 5. A read command is used for reading a piece of read target data requested by the host 2, or for reading a piece of copy target data specified by a copy command from the host 2, from the NAND flash memory 5. A read command is also used in a garbage collection operation to read a piece of data from a copy source block in the NAND flash memory 5.

In the NAND flash memory 5, the time required for executing a read command (read operation) is shorter than the time required for executing an erase command (erase operation) or a program command (program operation).

The time required for executing a read command (read operation) is, for example, several tens µs to 100 µs. The time required for executing an erase command (erase operation) or a program command (program operation) is, for example, 1 ms to several ms.

In this manner, the time required for executing one erase/program command (an erase command or a program command) is 10 times to several tens of times the time required for executing one read command.

The host 2 sometimes requires the flash storage device 1 to distribute the total time for accessing the NAND flash memory 5 to read operations and program operations at a predetermined ratio.

For example, it is assumed herein that the host 2 requests 50% of the total time for accessing the NAND flash memory 5 to be allocated to the read operations, and the remaining time to be allocated to the program operations, that is, requests the time to be allocated between the read operations and the program operations at a ratio of 1:1. Assuming that the time required in executing one read command is 100 µs and the time required in executing one program command is 3 ms, the time required in executing one program command is 30 times the time required in executing one read command. Therefore, under these assumptions, the scheduler 421 performs a scheduling operation so that read commands are executed at a frequency 30 times higher than that at which program commands are executed. In this manner, it is possible to distribute the time to the read operations and the program operations at a ratio of 1:1.

The host 2 may also request a distribution of the time to the read operations, the erase operations, and the program operations at a ratio of 1:1:1. Assuming that the time required in executing one read command is 100 µs, the time required in executing one erase command is 1 ms, and the time required in executing one program command is 3 ms, the time required in executing one erase command is 10 times the time required in executing one read command, and the time required in executing one program command is 30 times the time required in executing one read command. Therefore, the scheduler 421 performs a scheduling operation in such a manner that the read commands are executed at a frequency 10 times higher than that at which the erase commands are executed, and the read commands are executed at a frequency 30 times higher than that at which program commands are executed. In this manner, it is possible to distribute the time to the read operations, the erase operations, and the program operations at a ratio of 1:1:1.

The host 2 sometimes requires the flash storage device 1 to keep a variation in the latencies (read latency) in read commands below a certain value.

Therefore, the scheduler 421 performs a scheduling operation for selecting an input from which a command is to be processed, from (i) the first input for receiving the read commands to be sent to the NAND flash memory 5 and (ii) the second input for receiving the erase commands to be sent to the NAND flash memory 5 and the program commands to be sent to the NAND flash memory 5.

Processing of commands herein means causing the NAND flash memory 5 to execute operations corresponding to the commands by transmitting a command sequence for executing the operations corresponding to the commands to the NAND flash memory 5.

The scheduler 421 executes a scheduling operation for each of the NAND flash memory dies included in the NAND flash memory 5. A scheduling operation for a certain NAND flash memory die will be explained below as an example, but scheduling operations for the other NAND flash memory dies are also executed following the same steps.

The scheduler 421 includes a first input (input #0) for receiving a first command group including a read command to be sent to the NAND flash memory 5 and a second input (input #1) for receiving a second command group including at least one of an erase command to be sent to the NAND flash memory 5 and a program command to be sent to the NAND flash memory 5. The scheduler 421 executes the command input to the selected input. Explained below is an example in which an erase command to be sent to the NAND flash memory 5 and a program command to be sent to the NAND flash memory 5 are input to the second input (input #1), as the second command group.

In order to control the scheduling operation, the scheduler 421 manages a cumulative read (VTPS), a read count (RinQ), and an elapsed time (T), using a management table T #0.

The cumulative read (Virtual Time Per Suspend (VTPS)) is the sum of the number of read commands processed during a suspension. Alternatively, the VTPS may be the sum of weights associated with read commands processed during a suspension.

The read count (RinQ) is the number of read commands input to the input #0, that is, the number of unprocessed read commands stored in the command queue 61. Alternatively, RinQ may be the sum of the weights associated with the unprocessed read commands stored in the command queue 61.

The elapsed time (T) is a time elapsed from when the processing of the erase/program command is started. T is reset when the erase/program command is suspended. T starts being incremented again when the processing of the erase/program command is resumed. Therefore, T is a time elapsed from when the processing of one erase/program command is started, or a time elapsed from when the processing of one erase/program command is resumed after the processing is suspended.

The suspend manager 422 monitors the number of times or the total length of time by which the execution of an erase/program command has been suspended, based on the command sequence output from the scheduler 421 to the NAND flash memory 5. When the command being executed in the NAND flash memory 5 is an erase command or a program command, and the number of times or the total length of time by which the execution of the erase command or the program command has been suspended is smaller than the upper limit value, the suspend manager 422 gives a permission to issue a suspend command to the scheduler 421 by setting a flag (readable flag) indicating to permit a suspension to ON state.

The condition for causing the scheduler 421 to issue a suspend command is the number of read commands included in the first command group, that is, the number of unexecuted read commands stored in the command queue 61 reaching a first value (first suspend condition). Such unexecuted read commands having been input to the scheduler 421 are also referred to as pending read commands.

The number of suspensions permitted per one erase/program command is sometimes limited to a certain upper limit value. Therefore, when the number of read commands to be executed while an erase/program command is being suspended is too few, it becomes highly likely that the number of times at which the erase/program command is suspended exceeds the upper limit value. When the number of times by which the erase/program commands is suspended exceeds the upper limit value, it becomes no longer possible to suspend the execution of the erase/program command. Therefore, for example, when any read commands are input to scheduler 421 after the number of times by which this erase/program command is suspended has exceeded the upper limit value, such read commands cannot be executed until the execution of this erase/program command is completed. Therefore, the latency of these read commands become increased.

By suspending the execution of the erase/program command upon satisfaction of a condition that the number of read commands included in the first command group has reached the first value (first suspend condition), it is possible to execute read commands in a number equal to or greater than the first value while the erase/program command is being suspended once. In this manner, a variation in the latency of the read commands can be reduced.

In addition, as a condition for causing the scheduler 421 to issue the suspend command, it is also possible to use a condition (second suspend condition) that there is a read command in the first command group and the time elapsed from when the execution of the erase/program command is started or resumed has reached a second value.

By suspending the execution of an erase/program command when either one of the first suspend condition and the second suspend condition is satisfied, it is possible to suppress an increase in the latency in each of the read commands even if the number of unexecuted read commands stored in the command queue 61 is smaller than the first value.

For example, when a read command is input to scheduler 421 before the time corresponding to the second value elapses from when the erase/program command is started or resumed, the read command is not executed until the time corresponding to the second value elapses from when the erase/program command is started or resumed. In other words, the operation of suspending the execution of the erase/program command is kept standby until the time corresponding to the second value elapses from when the erase/program command is started or resumed. Since a new read command may arrive at the scheduler 421 during this time, it is possible to increase the number of pending read commands. When the time corresponding to the second value has elapsed from when the erase/program command is started or resumed, the execution of the erase/program command is suspended. Each of the pending read commands input to the scheduler 421 by this time is then executed.

The scheduler 421 manages the number of read commands included in the first command group, that is, the number of unexecuted read commands. Alternatively, the scheduler 421 may manage the sum of weights associated with the respective unexecuted read commands. The scheduler 421 may also determine whether the condition for issuing the suspend command is satisfied by comparing the sum of the weights associated with the respective unexecuted read commands with the first value, instead of comparing the number of unexecuted read commands with the first value.

The scheduler 421 manages the time elapsed from when the execution of the erase/program command is started. If there is one or more read commands stored in the command queue 61 when the time elapsed from when the execution of the erase/program command is started reaches the second value, the scheduler 421 issues a suspend command. The scheduler 421 also manages the time elapsed from when the execution of the erase/program command is resumed. If there is one or more read commands stored in the command queue 61 when the time elapsed from when the execution of the erase/program command has been resumed reaches the second value, the scheduler 421 issues a suspend command.

Specifically, when the read count (RinQ) reaches a minimum cumulative read (Minimums Virtual Time (MNVT)) that is the first value (when the first suspend condition is satisfied), the scheduler 421 suspends the execution of the erase/program command if the readable flag is ON, and starts the execution of the read command stored in the input #0, instead.

Furthermore, when there are one or more unprocessed read commands in the input #0 and the elapsed time (T) reaches the Maximum Suspend Interval (MXSI) that is the second value (when the second suspend condition is satisfied), the scheduler 421 suspends the execution of the erase/program command if the readable flag is ON, and starts the execution of the read command stored in the input #0, instead.

By contrast, when the readable flag is OFF, the scheduler 421 does not suspend the command being executed, even if RinQ reaches MNVT or T reaches the MXSI.

If the read count (RinQ) becomes 0 while the erase command or the program command is being suspended, the scheduler 421 resumes the execution of the erase command or the program command being suspended.

When the cumulative read (VTPS) reaches the maximum cumulative read count (Maximum Virtual Time Per Suspend (MXVTPS)) while the erase command or the program command is being suspended, the scheduler 421 resumes the execution of the erase command or the program command being suspended.

At this time, the weight associated with a read command may be included in the read command as a parameter. In addition, a common weight among all the read commands may be managed as a weight (Wr) of the read command.

At this time, the weight (Wr) of the read command, the minimum read count (MNVT), the maximum suspend interval (MXSI), and the maximum cumulative read count (MXVTPS) may be preset values or values specified by the host 2. The scheduler 421 manages the weight (Wr) of the read command, the minimum read count (MNVT), the maximum suspend interval (MXSI), and the maximum cumulative read count (MXVTPS), using a management table T #1.

In FIG. 5, the weight (Wr) of the read command is 1, for example. Wr=1 indicates that the weight associated with each read command is 1. When Wr=1, the sum of the weights associated with respective read commands indicates the same value as the read command count.

The minimum read count (MNVT) is, for example, 4. When the number of unexecuted read commands reaches 4 (or when the sum of the weights associated with the respective unexecuted read commands reaches 4) while the erase command or the program command is being executed, the scheduler 421 suspends the erase command or the program command.

The maximum suspend interval (MXSI) is, for example, 5. When the time elapsed from when the execution of the erase command or the program command is started or resumed reaches 5, the scheduler 421 suspends the erase command or the program command.

The maximum cumulative count (MXVTPS) is 8, for example. When the sum of the number of read commands processed during one suspend of the erase command or the program command, that is, the VTPS reaches 8, the scheduler 521 resumes the execution of the erase command or the program command being suspended.

Figure 6:
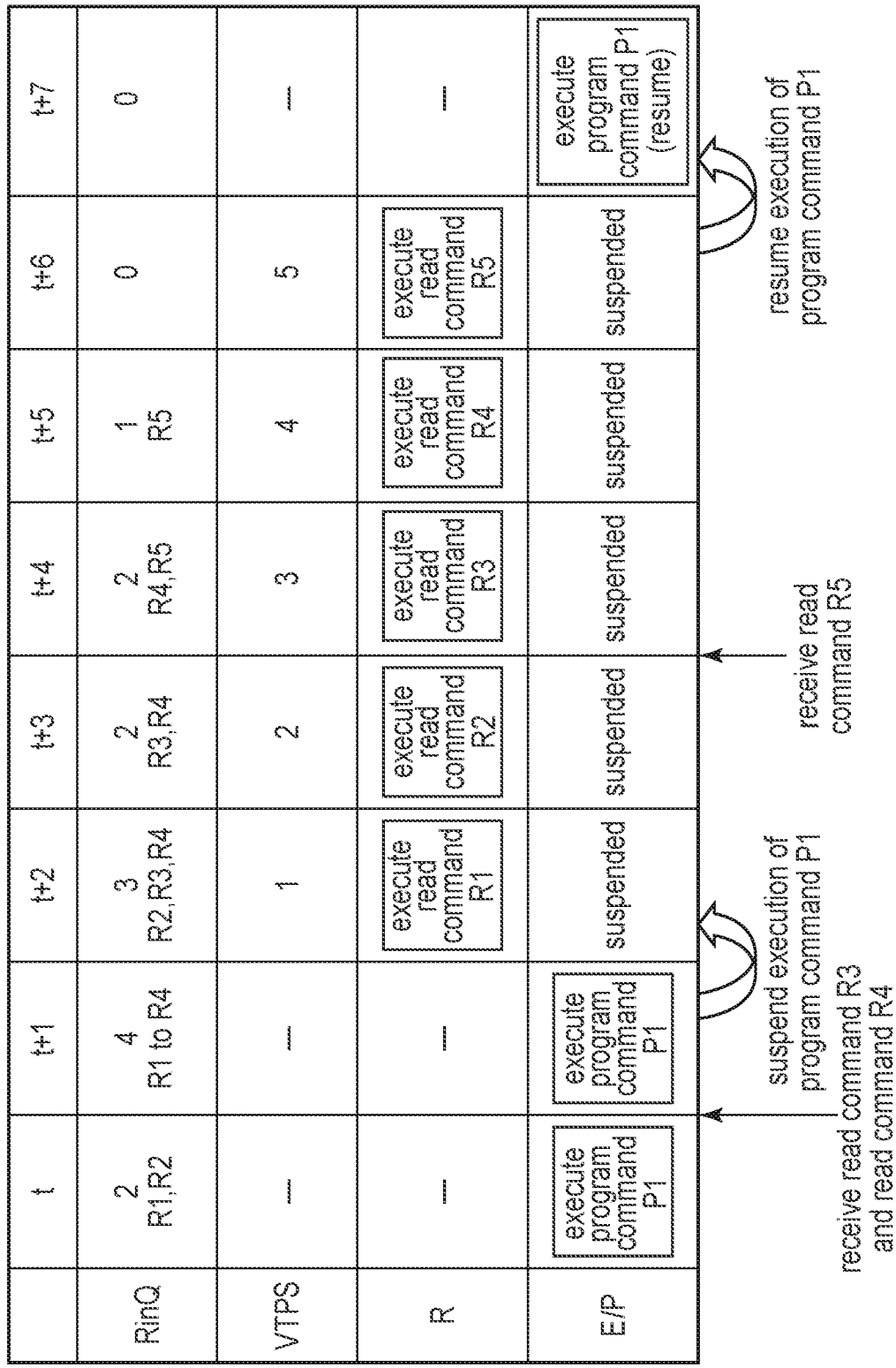
FIG. 6 is a diagram illustrating an operation for suspending a program command based on the number of a plurality of read commands having been received while the program command is being executed, which is performed in the memory system according to the embodiment.

An operation for executing the suspending operation in response to RinQ reaching MNVT while a program command is being executed will be explained. FIG. 6 is a diagram for explaining the operation for suspending a program command based on the number of a plurality of read commands having been received while the program command is being executed in the memory system according to the embodiment.

To begin with, at time t, the program command P1 is being executed, and the number of unexecuted read commands (RinQ) is two. The command queue 61 stores therein a read command R1 and a read command R2.

At time t+1, a read command R3 and a read command R4 are stored in the command queue 61. As a result, RinQ becomes 4. The controller 4 then determines that RinQ has reached the MNVT (that first suspend condition is satisfied).

At time t+2, the controller 4 then suspends the execution of the program command P1 by transmitting a suspend command to the NAND flash memory 5. The controller 4 then executes the read command R1. The number of read commands (VTPS) executed during the suspension becomes 1. RinQ then becomes 3.

At time t+3, the controller 4 executes the read command R2. The VTPS then becomes 2. RinQ then becomes 2.

The controller 4 then receives another read command R5. At time t+4, the controller 4 executes the read command R3. The VTPS then becomes 3. RinQ then becomes 2.

At time t+5, the controller 4 executes the read command R4. The VTPS then becomes 4. RinQ then becomes 1.

At time t+6, the controller 4 executes the read command R5. The VTPS then becomes 5. RinQ becomes 0. As a result, the controller 4 determines that there is no more unexecuted read command.

At time t+7, the controller 4 then resumes the execution of the program command P1 by issuing a resume command to the NAND flash memory 5. By this time, the VTPS has been reset. No read command is stored in the command queue 61. As described above, even if the number of read commands (VTPS) executed during the suspension does not reach MXVTPS (=8), when there is no more unexecuted read command in the first command group, the execution of the program command P1 is resumed.

Figure 7:
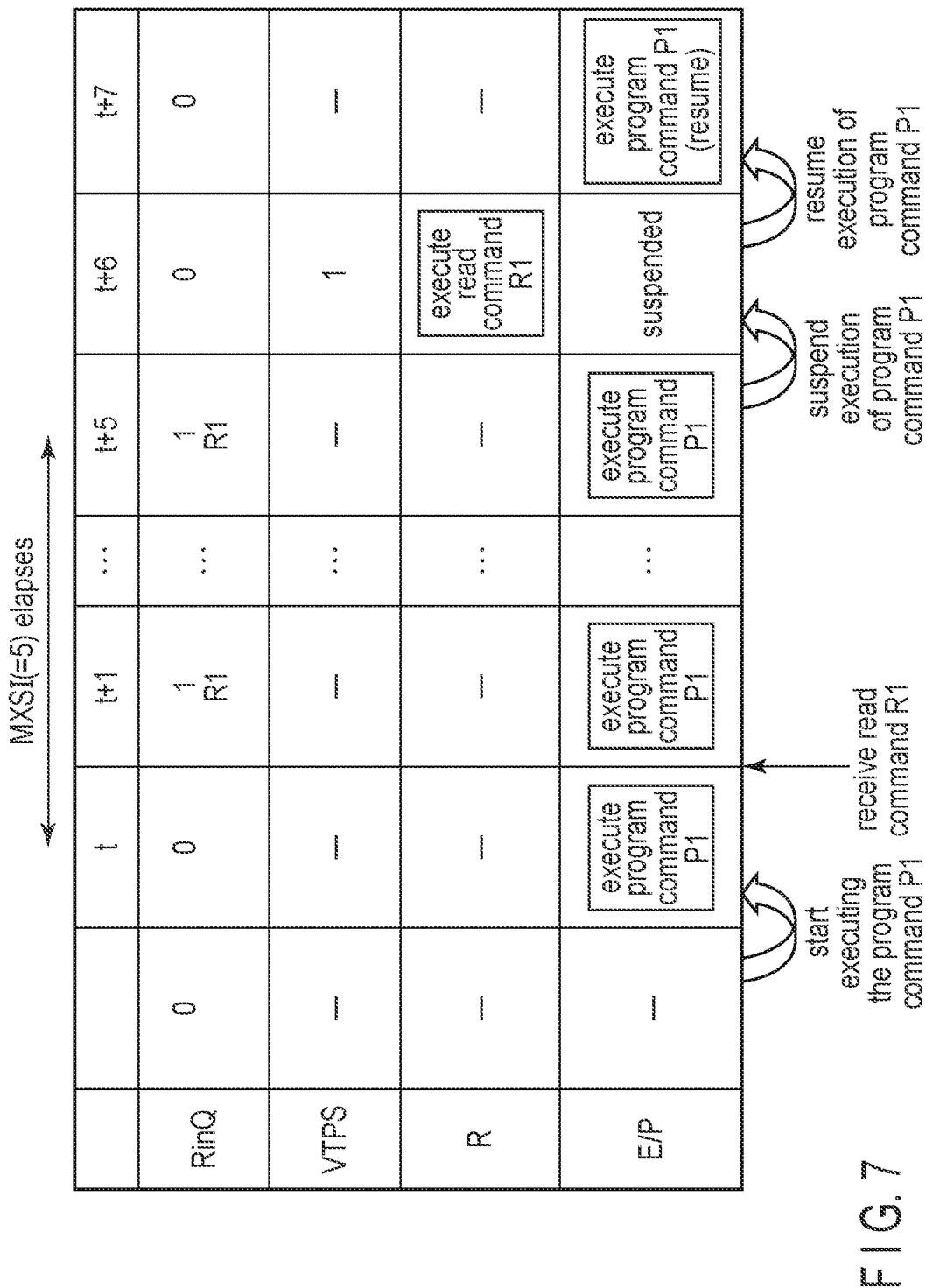
FIG. 7 is a diagram illustrating an operation for suspending a program command based on the time elapsed from when the execution of the program command is started, which is performed in the memory system according to the embodiment.

Explained is an operation for executing a suspending operation while a program command is being executed. The suspending operation is executed in response to the time T reaching MXSI. The time T is the time elapsed from when the execution of the program command is started. FIG. 7 is a diagram for explaining the operation for suspending a program command based on the time elapsed from when the execution of the program command is started, in the memory system according to the embodiment.

To begin with, at time t, the controller 4 starts executing the program command P1. At this time, the number of unexecuted read commands (RinQ) is 0.

At time t+1, a read command R1 is stored in the command queue 61. As a result, RinQ becomes 1. When it is determined that updated RinQ has not reached the MNVT yet, the controller 4 determines not to issue a suspend command for suspending the program command P1.

At time t+5, the controller 4 then determines that the time elapsed from the time t at which the execution of the program command P1 is started has reached the MXSI. Because RinQ is equal to or greater than 1, the controller 4 determines that the second suspend condition is satisfied.

At time t+6, the controller 4 then suspends the execution of the program command P1 by transmitting a suspend command to the NAND flash memory 5. The controller 4 then executes the read command R1. The number of read commands (VTPS) executed during the suspension becomes 1. RinQ becomes 0. As a result, the controller 4 determines that there is no more unexecuted read command.

At time t+7, the controller 4 resumes the execution of the program command P1 by issuing a resume command to the NAND flash memory 5. By this time, the VTPS has been reset. No read command is stored in the command queue 61.

Figure 8:
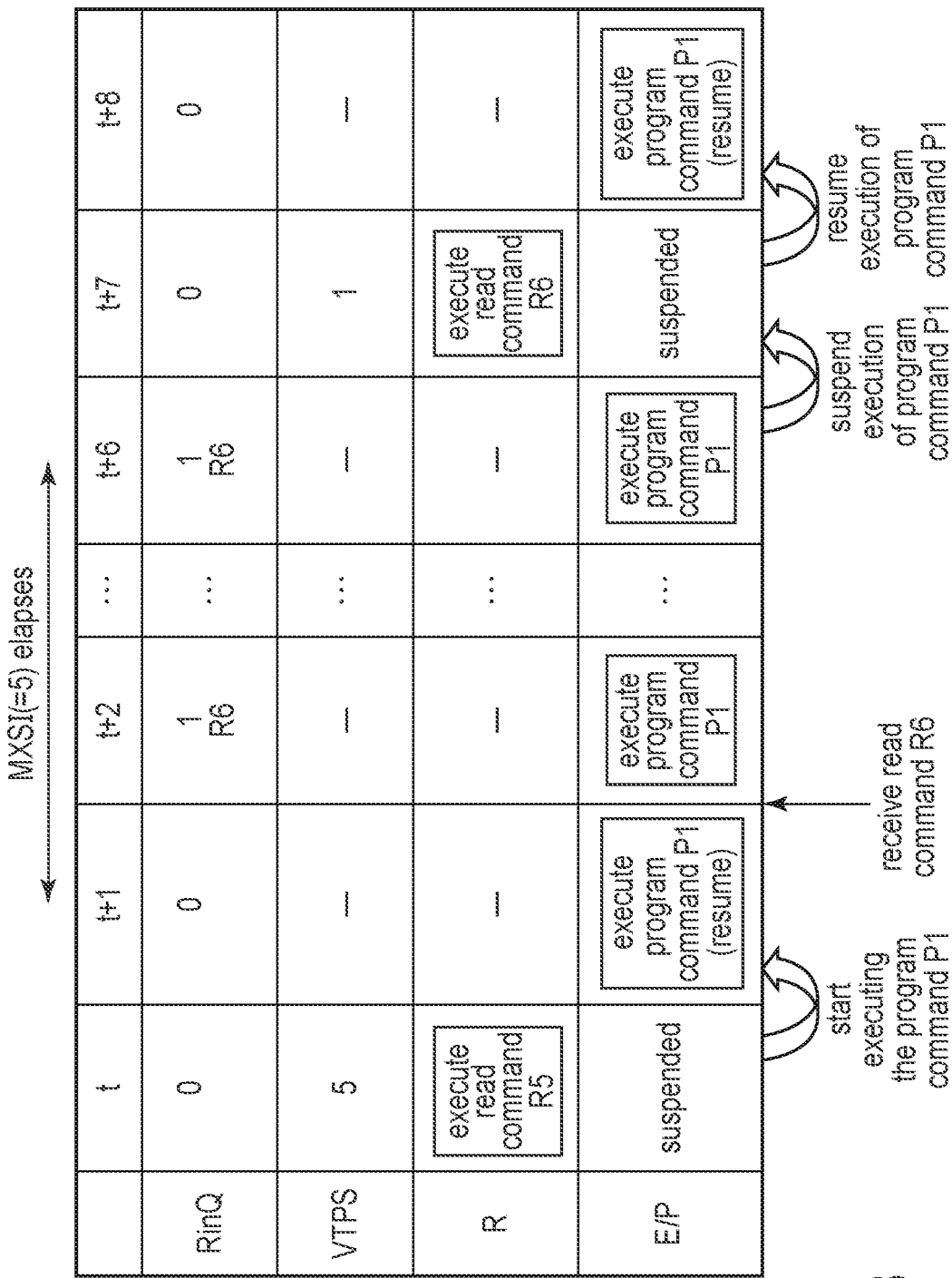
FIG. 8 is a diagram illustrating an operation for suspending a program command based on the time elapsed from when the program command has been resumed, which is performed in the memory system according to the embodiment.

Explained is an operation for executing a suspending operation while a program command is being executed, the suspending operation being executed in response to the time T reaching the MXSI, the time T being the time elapsed from when the execution of the program command is resumed. FIG. 8 is a diagram for explaining the operation for suspending a program command based on the time elapsed from when the execution of the program command is resumed in the memory system according to the embodiment.

At time t, the program command P1 is suspended. Furthermore, the read command R5 is being executed. The number of read commands (VTPS) executed while the program command P1 is being suspended is 5. Because the read command R5 has been executed, the number of unexecuted read commands (RinQ) stored in the command queue 61 is 0. As a result, the controller 4 determines that there is no more unexecuted read command. At time t+1, the controller 4 then resumes the execution of the program command P1 by transmitting a resume command to the NAND flash memory 5. By this time, the VTPS has been reset. No read command is stored in the command queue 61.

At time t+2, a read command R6 is stored in the command queue 61. As a result, RinQ becomes 1. When it is determined that updated RinQ has not reached the MNVT yet, the controller 4 determines not to issue a suspend command for suspending the program command P1.

At time t+6, the controller 4 determines that the time elapsed from the time t+1 at which the execution of the program command P1 is resumed has reached the MXSI. Because RinQ is equal to or greater than 1, the controller 4 determines that the second suspend condition is satisfied.

At time t+7, the controller 4 then suspends the execution of the program command P1 by transmitting a suspend command to the NAND flash memory 5. The controller 4 then executes the read command R6. The VTPS becomes 1. RinQ then becomes 0.

At time t+8, the controller 4 resumes the execution of the program command P1 having been suspended, by issuing a resume command to the NAND flash memory 5. By this time, the VTPS has been reset. No read command is stored in the command queue 61.

Figure 9:
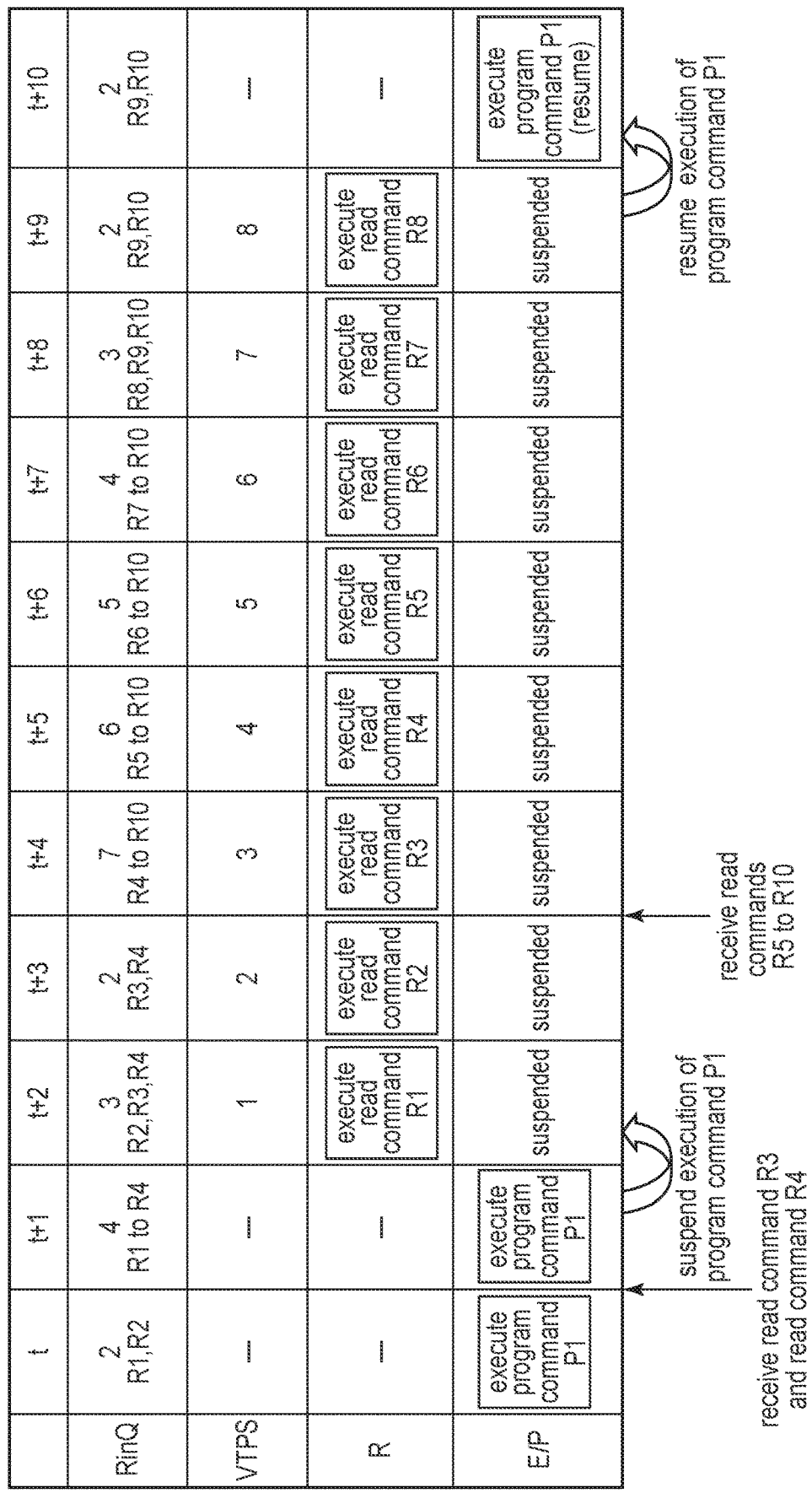
FIG. 9 is a diagram illustrating an operation for resuming the execution of the program command having been suspended, based on the number of read commands executed while the program command is being suspended, which is performed in the memory system according to the embodiment.

Explained is an operation for resuming the execution of the program command being suspended, in response to the number of read commands executed during the suspension of the program command reaching MXVTPS. FIG. 9 is a diagram for explaining an operation for resuming the execution of the program command having been suspended, based on the number of read commands executed while the program command is being suspended, in the memory system according to the embodiment.

To begin with, at time t, the controller 4 is executing the program command P1. The number of read commands (RinQ) stored in the command queue 61 is 2.

At time t+1, the read command R3 and the read command R4 are stored in the command queue 61. As a result, RinQ becomes 4. When it is determined that updated RinQ has reached the MNVT, the controller 4 determines to issue a suspend command for suspending the program command P1 to the NAND flash memory 5.

At time t+2, the controller 4 then suspends the execution of a program command P1 by transmitting a suspend command to the NAND flash memory 5. The controller 4 executes the read command R1. The number of read commands (VTPS) executed during the suspension is 1. Because the read commands R2, R3, and R4 are stored in the command queue 61, RinQ is 3.

At time t+3, the controller 4 executes the read command R2. The VTPS becomes 2. Because the read commands R3 and R4 are stored in the command queue 61, RinQ is 2.

At time t+4, the read commands R5 to R10 are stored in the command queue 61. The controller 4 then executes the read command R3. The VTPS is 3. Because the read commands R4 to R10 are stored in the command queue 61, RinQ is 7.

At time t+5, the controller 4 then executes the read command R4. The VTPS is 4. Because the read commands R5 to R10 are stored in the command queue 61, RinQ is 6.

At time t+6, the controller 4 executes the read command R5. The VTPS is 5. Because the read commands R6 to R10 are stored in the command queue 61, RinQ is 5.

At time t+7, the controller 4 executes the read command R6. The VTPS is 6. Because the read commands R7 to R10 are stored in the command queue 61, RinQ is 4.

At time t+8, the controller 4 executes the read command R7. The VTPS is 7. Because the read commands R8, R9, and R10 are stored in the command queue 61, RinQ is 3.

At time t+9, the controller 4 executes the read command R8. The VTPS is 8. Because the read commands R9 and R10 are stored in the command queue 61, RinQ is 2. At this time, the controller 4 determines that the VTPS has reached the maximum cumulative read count (MXVTPS). The controller 4 having determined that the VTPS has reached MXVTPS determines to issue a resume command that causes the NAND flash memory 5 to resume the execution of the program command P1 being suspended.

At time t+10, the controller 4 resumes the execution of the program command P1 by transmitting a resume command to the NAND flash memory 5. The VTPS is then reset. The number of unexecuted read commands (RinQ) is 2.

Explained is an example in which the scheduler 421 selects a high priority input from a plurality of inputs by using a cumulative weight. FIG. 10 is a diagram illustrating a scheduler that executes a scheduling operation using a cumulative weight, in the memory system according to the embodiment.

The scheduler 421 manages the cumulative weight (VT) using the table T #0, in addition to the cumulative read (VTPS), the number of unexecuted read commands (RinQ), and the elapsed time (T) explained with reference to FIG. 5. The scheduler 421 may also manage a weight (Wp) for program commands and a weight (We) for erase commands, using the table T #1, in addition to the weight (Wr) of read commands. Alternatively, the scheduler 421 may use a weight included in each command.

Explained herein is an example in which the scheduler 421 uses a policy (policy #1) by which the input #0 (first command group) is selected as a high priority input (command group) when the cumulative weight (VT) is greater than an initial value (e.g., 0), and selects the input #1 (second command group) as a high priority input (command group) when the cumulative weight is smaller than the initial value.

In this example, when the execution of a read command of the first command group is started, the cumulative weight is updated to a value obtained by subtracting the weight associated with the read command from the cumulative weight.

When the execution of an erase/program command in the second command group is started, the cumulative weight is updated to a value obtained by adding a weight associated with the erase/program command, to the cumulative weight.

While the condition of the cumulative weight being greater than the initial value is satisfied, the first command group is selected as the high priority command group. That is, while the cumulative weight is greater than the initial value, every read command input to the input #0 is executed at a higher priority than any erase command or program command input to the input #1. By contrast, while the condition of the cumulative weight being smaller than the initial value is satisfied, the second command group is selected as a high priority command group. That is, while the cumulative weight is smaller than the initial value, every erase command and program command input to the input #1 are executed at a higher priority than any read command input to the input #0.

Therefore, for example, when the weight associated with each read command is set to a small value, even if the first command group is selected as a high priority command group, the cumulative weight become reduced only slightly. Even if the execution of a read command of the first command group has been started, the cumulative weight becomes reduced only slightly. Therefore, it is likely for the cumulative weight to be maintained at a level greater than the initial value, and as a result, it is more likely for the first command group to be selected again as the high priority input.

In addition, when the weight associated with each erase/program command is set to a large value, once the second command group is selected as a high priority input, the cumulative weight increases by a large degree. Therefore, when the weight associated with each erase/program command is set to a large value, once the second command group is selected as the high priority command group, the cumulative weight increases greatly, and keeps the likeliness of the second command group to be selected as the high priority input low for a while.

Therefore, for example, by setting the weight associated with each read command to 1, and setting the weight associated with each erase/program command to 30, it is possible to cause the read commands to be executed 30 times more frequently than the erase/program commands.

When the cumulative weight is equal to the initial value, either one of the read command in the first command group or the erase/program command in the second command group may be executed. In addition, even if the cumulative weight is smaller than the initial value, when there is no erase/program command in the second command group, the read command in the first command group is executed. In the same manner, even if the cumulative weight is greater than the initial value, when there is no read command in the first command group, an erase/program command in the second command group is executed.

Once the cumulative weight reaches a certain upper limit value, the cumulative weight is not increased even if the execution of a new erase/program command is started, and the cumulative weight remains at the upper limit value. In the same manner, once the cumulative weight reaches a certain lower limit value, the cumulative weight is not decreased even if the execution of a new read command is started, and the cumulative weight remains at the lower limit value.

Although explained above are examples using the policy #1, a policy #2 may be used, instead of using the policy #1.

With the policy #2, the first command group is selected as the high priority command group when the cumulative weight is smaller than the initial value (e.g., 0), and the second command group is selected as the high priority command group when the cumulative weight is greater than the initial value.

In this example in which the policy #2 is used, when the execution of a read command of the first command group is started, the cumulative weight is updated to a value obtained by adding the weight associated with the read command to the cumulative weight. When the execution of an erase/program command in the second command group is started, the cumulative weight is updated to a value obtained by subtracting the weight associated with the erase/program command from the cumulative weight.

In addition, in the example in which the policy #2 is used, while a condition of the cumulative weight being smaller than the initial value is satisfied, the first command group is selected as a high priority command group. That is, while the cumulative weight is smaller than the initial value, every read command in the first command group is executed at a higher priority than any erase command and program command in the second command group.

By contrast, while the condition of the cumulative weight being greater than the initial value is satisfied, the second command group is selected as a high priority command group. That is, while the cumulative weight is greater than the initial value, every erase/program command input to the second command group is executed at a higher priority than any read command input to the first command group.

In the example herein, each read command is associated with a weight of 1, each erase command is associated with a weight of 10, and each program command is associated with a weight of 30. As a result, the frequencies at which the read commands, the erase commands, and the program commands are processed may be 1:10:30. This ratio may be determined based on the time required to execute of the commands of each type, for example.

The number of read commands that can be stored in the command queue 61 may then be changed based on the cumulative weight (VT). When the cumulative weight (VT) satisfies the condition for selecting the input #0 as a high priority input (VT>0), the controller 4 sets the upper limit value of the number of read commands that can be stored in the command queue 61 to a number proportional to the cumulative weight (VT). For example, when the VT is 30 and each read command has a weight of 1, 30 is set as the upper limit value of the number of read commands that can be stored in the command queue 61. In addition, when the VT is 30 and each read command has a weight of 2, the upper limit value of the number of read commands that can be stored in the command queue 61 is set to 15. As a result, it is possible to control to bring the ratio at which the number of read commands to be executed and the number of erase/program commands to be executed close to the ratio corresponding to the target time allocation efficiently, without increasing the size of the command queue 61 more than necessary. In addition, when the cumulative weight does not satisfy the condition for selecting the input #0 as the input with a high priority (VT≤0), the controller 4 sets 1 as the upper limit value of the number of read commands that can be stored in the command queue 61. As a result, while the cumulative weight (VT) does not satisfy the condition for selecting the first input as the high priority input (VT≤0), the maximum number of read commands that can be stored in the command queue 61 can be maintained at 1. Therefore, for example, it is possible to start executing the read command in the command queue 61 immediately after all of the erase/program commands in the input #1 has been processed.

An operation for updating the cumulative weight (VT) will be explained. FIG. 11 is a diagram illustrating a VT updating operation executed when the scheduler starts executing a read command in the input #0, and a VT updating operation executed when the scheduler starts executing an erase or program command in the input #1. It is assumed herein that the policy #1 is used.

Explained with reference to (A) of FIG. 11 is an example in which three read commands are consecutively input to the input #0 and no erase command or program command is input to the input #1. Each of these read commands input to the input #0 is set with a weight Wr (=1). The flash storage device 1 executes these read commands consecutively.

To begin with, at time t, the VT is set to an initial value (e.g., 0). Because it is assumed that no erase command or program command has been input to the input #1, the first read command in the input #0 is selected as the next command to be executed. When the execution of the first read command is started at time t+1, the weight Wr corresponding to the first read command is subtracted from the VT, and VT=0−1=−1 is obtained.

When the execution of the first read command is completed, the execution of the second read command is started at time t+2. When the execution of the second read command is started, the weight Wr corresponding to the second read command is subtracted from the VT, and VT=−1−1=−2 is obtained.

When the execution of the second read command is completed, the execution of the third read command is started at time t+3. When the execution of the third read command is started, the weight Wr corresponding to the third read command is subtracted from the VT, and VT=−2−1=−3 is obtained.

In this manner, every time the execution of a read command is started, the VT is updated using the weight corresponding to the read command.

Explained with reference to (B) of FIG. 11 is an example in which no read command is input to the input #0, and a program command, an erase command, and a program command are input to the input #1 in the order listed herein.

To begin with, at time t, the VT is set to an initial value (e.g., 0). Because it is assumed that no read command has been input to the input #0, the first command in the input #1 (in this example, the program command) is selected as the next command to be executed. When the execution of the program command is started at time t+1, the weight Wp (=30) corresponding to the program command is added to the VT, and VT=0+30=+30 is obtained.

When the execution of the program command is completed, the execution of the next command (in this example, the erase command) is started at time t+2. When the execution of the erase command is started, the weight We (=10) corresponding to the erase command is added to the VT, and VT=30+10=+40 is obtained.

When the execution of the program command is completed, the execution of another next command (in this example, a program command) is started at time t+3. In a case where 40 is set as the upper limit value for the VT, even when execution of this program command is started, the VT is maintained at the upper limit value (=+40).

In this manner, every time the execution of the program command or the erase command is started, the VT is updated using the weight corresponding to the program command or the erase command.

Figure 12:
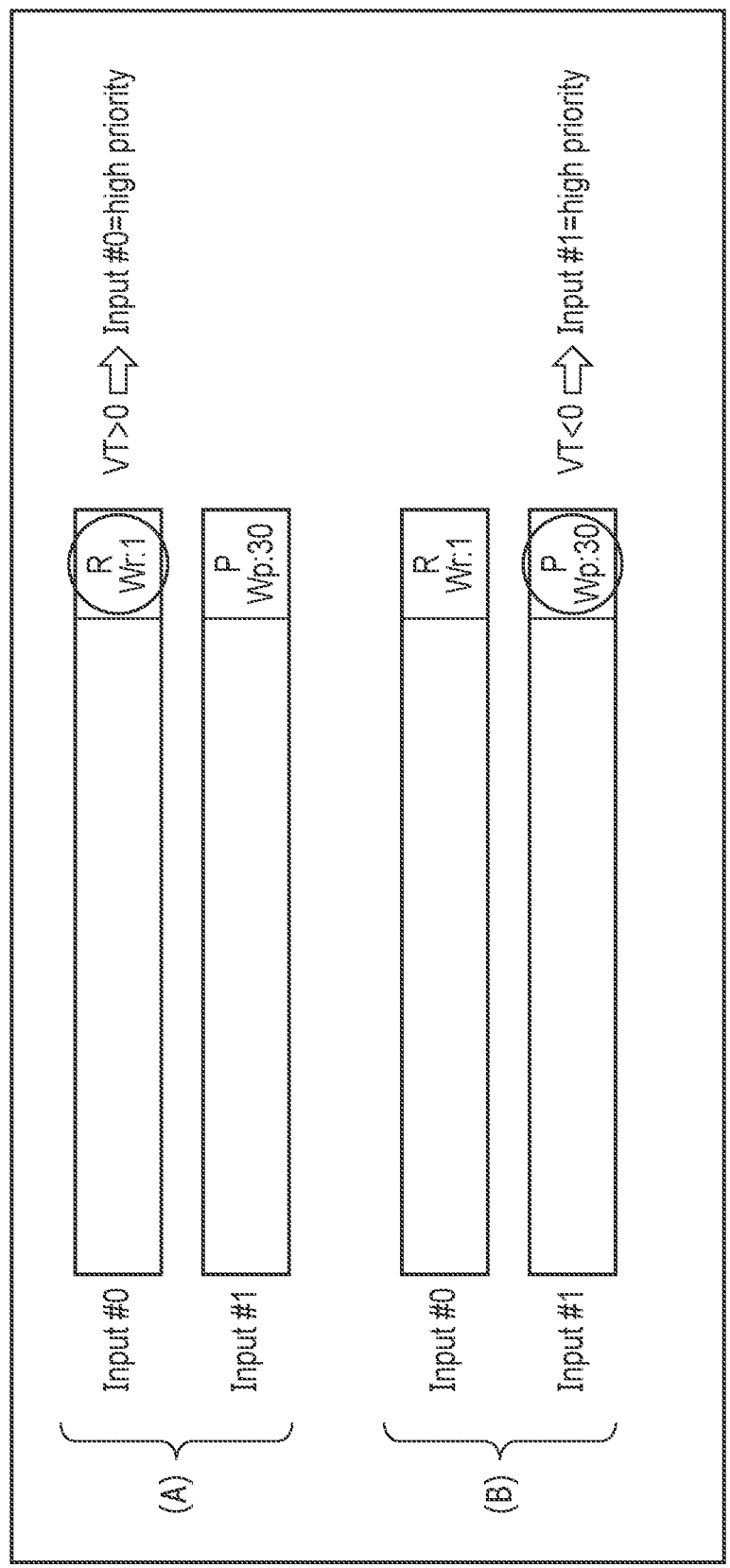
FIG. 12 is a diagram illustrating an operation for selecting a high priority input for which a command is to be executed, from the input #0 and the input #1, based on the VT.

An operation in which the controller 4 selects a high priority input based on the cumulative weight will be explained. (A) of FIG. 12 is a diagram illustrating an operation for selecting a high priority input from the input #0 and the input #1 based on the VT. In both of (A) and (B) of FIG. 12, it is assumed that some commands have been input to the two inputs, the input #0 and the input #1, respectively.

Illustrated in (A) of FIG. 12 is an example in which the VT is greater than 0. When the VT is greater than 0, the scheduler 421 selects the input #0 as a high priority input, and starts executing the command (read command) input to the input #0.

Illustrated in (B) of FIG. 12 is an example in which the VT is smaller than 0. When the VT is smaller than 0, the scheduler 421 selects the input #1 as a high priority input, and starts executing the command (in this example, a program command) input to the input #1.

An operation in which the controller 4 executes the read command and the program command based on the cumulative weight will be explained. FIG. 13 is a diagram illustrating an operation of starting executing a program command input to the input #1 after the execution of some read commands having been input to the input #0 is completed.

To begin with, at time t, the VT is set to an initial value (e.g., 0). It is assumed herein that two read commands are input to the input #0 consecutively and no erase command or program command is input to the input #1.

At time t+1, the execution of the first read command in the input #0 is started, and Wr (=1) corresponding to the first read command is subtracted from the VT, and VT=0−1=−1 is obtained. At time t+2, the execution of the second read command is then started, and Wr (=1) corresponding to the second read command is subtracted from the VT, and VT=−1−1=−2 is obtained. When a program command is input to the input #1, because VT<0 is established, the scheduler 421 selects the input #1 as a high priority input.

Therefore, at time t+3, the execution of the program command is started, and Wp (=30) corresponding to this program command is added to the VT, and VT=−2+30=+28 is obtained. It is assumed herein that a subsequent read command is input to the input #0. At this time, because VT>0 is established, when the execution of the program command is completed, the scheduler 421 selects the input #0 as the high priority input.

At time t+4, the execution of the subsequent read command is then started, and Wr (=1) corresponding to the subsequent read command is subtracted from the VT, and VT=+28−1=+27 is obtained.

In this manner, commands are executed while the cumulative weight VT is being updated based on the weights of the respective commands.

Figure 14:
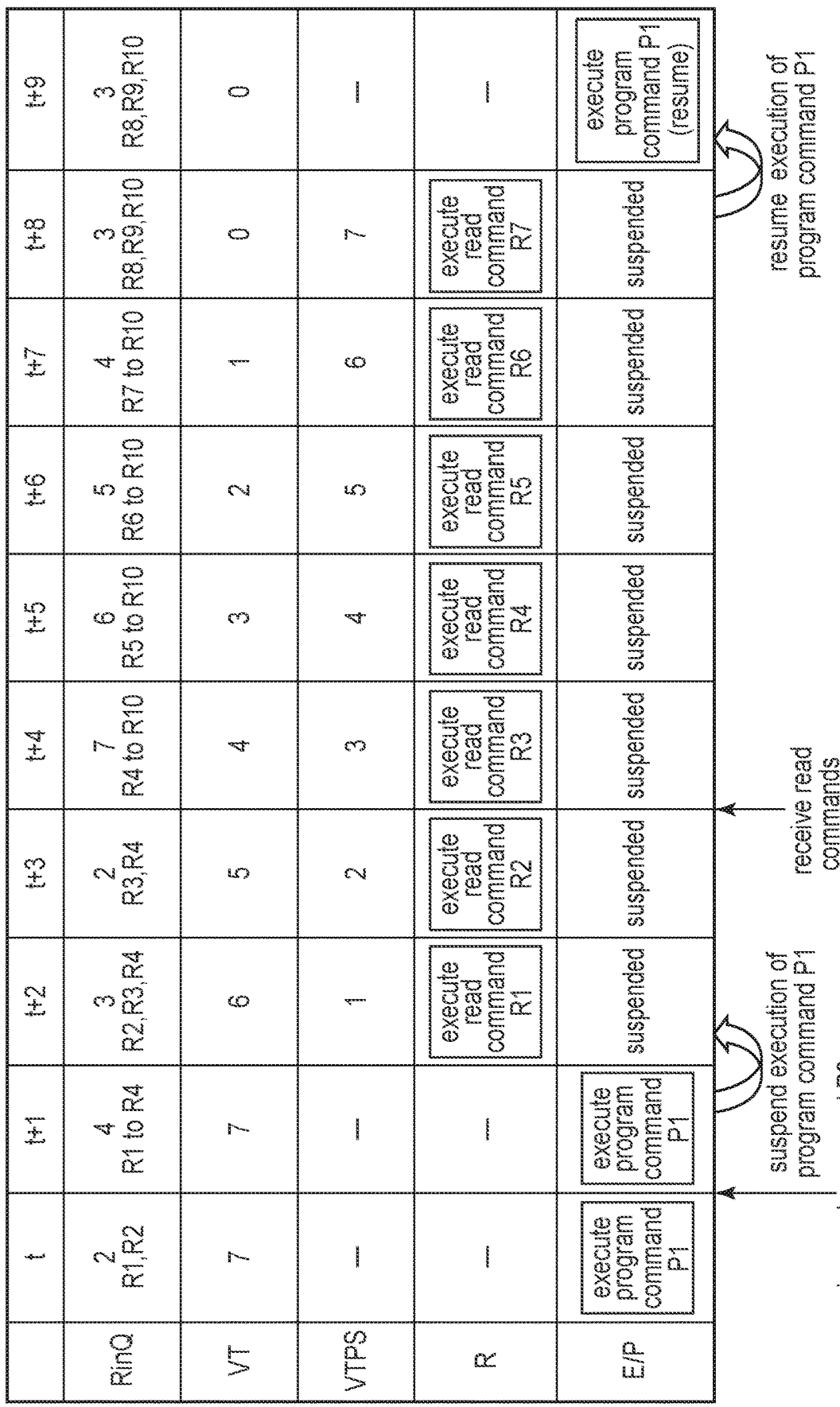
FIG. 14 is a diagram illustrating an operation for suspending a program operation being executed, based on the number of read commands received while the program command is being executed, and for resuming the execution of the program operation being suspended, based on the VT having been updated during the suspension, which is performed in the memory system according to the embodiment.

An operation of resuming the execution of the program command having been suspended based on the cumulative weight will be explained. FIG. 14 is a diagram illustrating an operation for suspending the program operation being executed, based on the number of read commands received while the program command is being executed, and for resuming the execution of the suspended operation of the program based on the VT updated during the suspension, in the memory system according to the embodiment.

To begin with, at time t, the controller 4 is executing the program command P1. At this time, the cumulative weight (VT) is 7. The number of unexecuted read commands (RinQ) stored in the command queue 61 is 2.

At this time, a read command R3 and a read command R4 are stored in the command queue 61 At time t+1. Because the read commands R1 to R4 are stored in the command queue 61, RinQ is 4. As a result, the controller 4 determines that RinQ has reached the MNVT, and that the VT is equal to or greater than 0. The controller 4 determines to issue a suspend command for suspending the program command P1 being executed, to the NAND flash memory 5. The NAND flash memory 5 having received the suspend command suspends the execution of the program command P1.

At time t+2, the controller 4 suspends the execution of the program command P1 by transmitting a suspend command to the NAND flash memory 5. The controller 4 executes the read command R1. It is assumed herein that the weight assigned to each read command is 1. The VT is 6 (=7−1). The number of read commands (VTPS) executed during the suspension is 1. RinQ is 3.

At time t+3, the controller 4 executes the read command R2. The VT is 5 (=6−1). The VTPS becomes 2. RinQ is 2.

At time t+4, the read commands R5 to R10 are stored in the command queue 61. The controller 4 executes the read command R3. The VT is 4 (=5−1). The VTPS is 3. RinQ is 7.

At time t+5, the controller 4 executes the read command R4. The VT is 3 (=4−1). The VTPS is 4. RinQ is 6.

At time t+6, the controller 4 executes the read command R5. The VT is 2 (=3−1). The VTPS is 5. RinQ is 5.

At time t+7, the controller 4 executes the read command R6. The VT is 1 (=2−1). The VTPS is 6. RinQ is 4.

At time t+8, the controller 4 executes the read command R7. The VT is 0 (=1−1). The VTPS is 7. RinQ is 3. In response to the VT becoming equal to or smaller than 0, the controller 4 determines to issue a resume command for resuming the execution of the program command P1 having been suspended, to the NAND flash memory 5.

At time t+9, the controller 4 resumes the execution of the program command P1. Because the program command P1 has already been started, the VT is not incremented. Therefore, the VT is 0. The VTPS has been reset. RinQ is 3.

Figure 15:
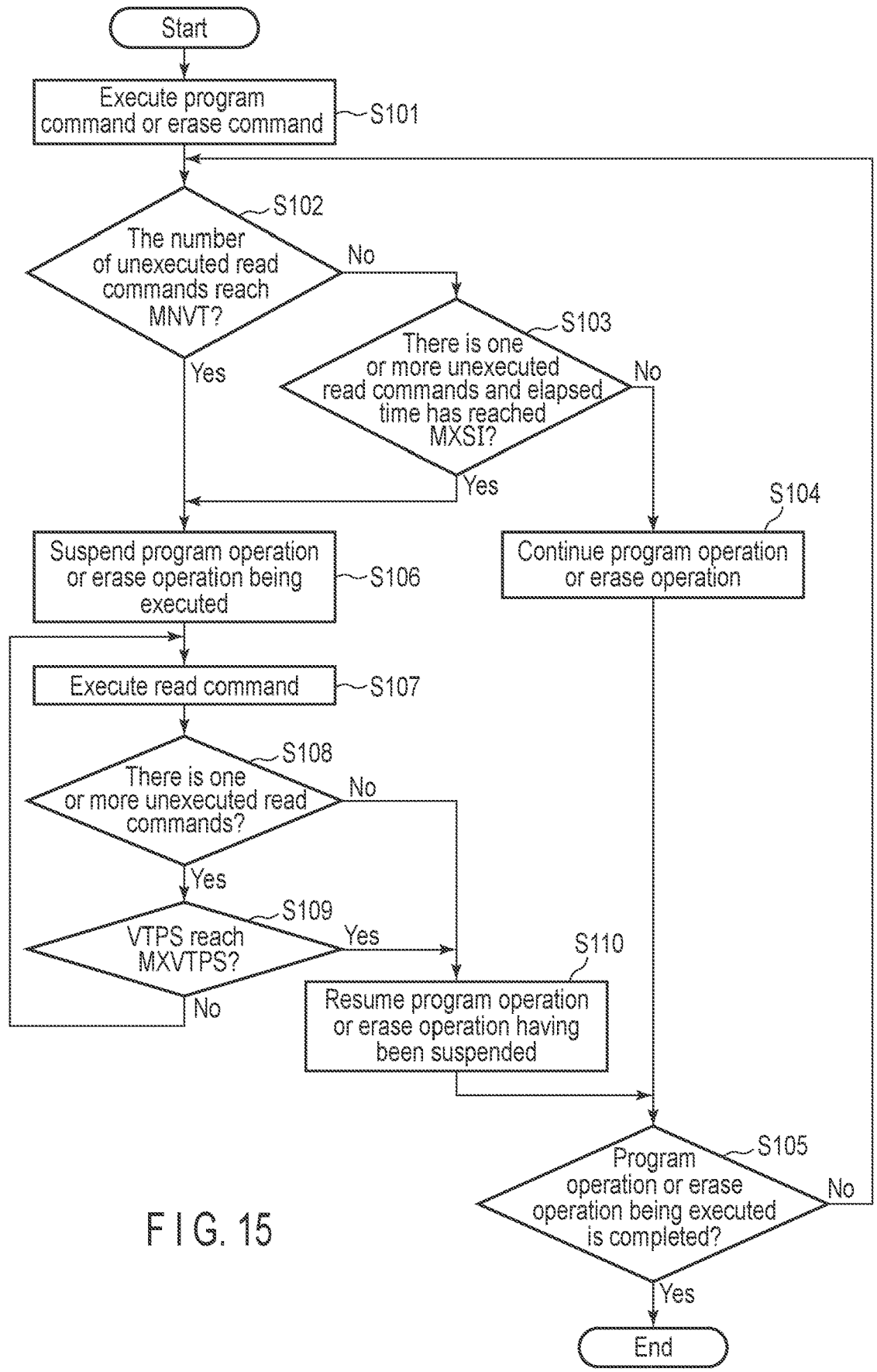
FIG. 15 is a flowchart illustrating a sequence of a scheduling operation including a suspending operation and a resuming operation.

The sequence of the scheduling operation will be explained. FIG. 15 is a flowchart illustrating a sequence of a scheduling operation including a suspending operation and a resuming operation.

It is assumed herein that the second input has been selected. The controller 4 executes a program command or an erase command (Step S101). The controller 4 executes the program command or the erase command by transmitting the program command or the erase command to the NAND flash memory 5.

The controller 4 determines whether the number of unexecuted read commands (RinQ) has reached the minimum read count (MNVT) (Step S102). The controller 4 may also manage the sum of the weights associated with the read commands stored in the command queue 61 as RinQ.

When RinQ has not reached the MNVT, that is, if the first suspend condition is not satisfied (No in Step S102), the controller 4 determines whether the second suspend condition is satisfied, that is, determines whether there is one or more unexecuted read commands and the time elapsed from when the program operation or the erase operation is started or resumed has reached the maximum suspend interval (MXSI) (Step S103).

When the second suspend condition has not been satisfied (No in Step S103), the controller 4 continues the program operation or the erase operation being executed (Step S104).

The controller 4 then determines whether the program operation or the erase operation being executed is completed (Step S105).

When the program operation or the erase operation being executed is completed (Yes in Step S105), the controller 4 ends the scheduling operation for controlling the operation for suspending the program operation or the erase operation.

When the program operation or the erase operation being executed is not completed (No in Step S105), the controller 4 returns to Step S102. The controller 4 then determines again whether to execute the operation for suspending the program operation or the erase operation being executed.

When RinQ has reached the MNVT (Yes in Step S102), or if there is one or more unexecuted read commands and the elapsed time has reached the MXSI (Yes in Step S103), the controller 4 suspends the program operation or the erase operation being executed (Step S106). The controller 4 transmits a suspend command to the NAND flash memory 5.

The controller 4 then executes a read command (Step S106). In response to the execution of the read command, the controller 4 updates RinQ and the number of read commands (VTPS) executed during this suspension.

The controller 4 then determines whether there is one or more unexecuted read commands (Step S108).

When there is one or more unexecuted read commands (Yes in Step S108), the controller 4 determines whether the VTPS has reached the maximum cumulative read count (MXVTPS) (Step S109).

When the VTPS has not reached the MXVTPS (No in Step S109), the controller 4 further executes the next read command stored in the command queue 61 (Step S107).

When there is no more unexecuted read command (No in Step S108) or if the VTPS has reached the MXVTPS (Yes in Step S109), the controller 4 resumes the program operation or the erase operation having been suspended (Step S110). The controller 4 issues a resume command for resuming the program operation or the erase operation having been suspended in Step S106 to the NAND flash memory 5.

The controller 4 then goes to Step S105.

Figure 16:
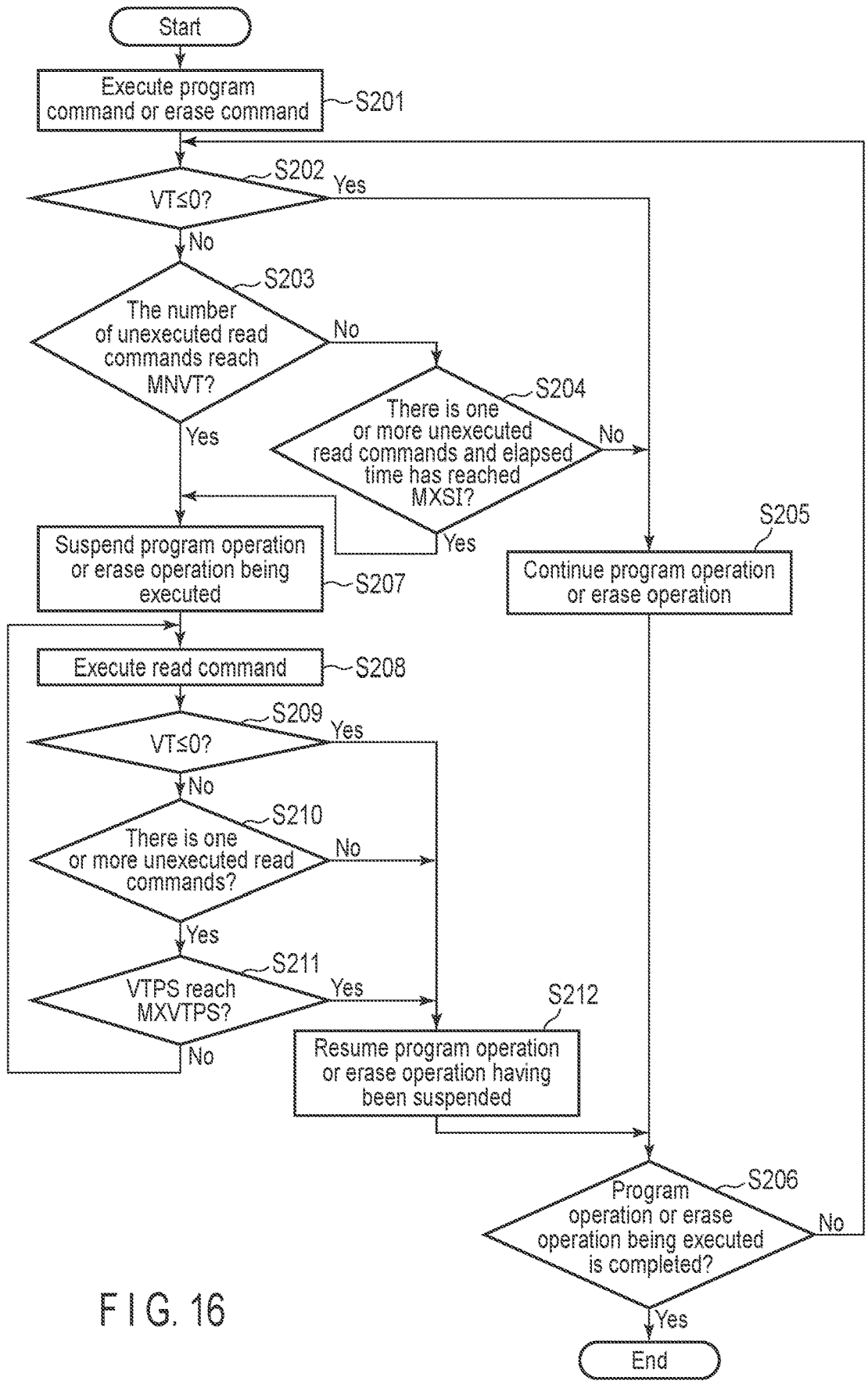
FIG. 16 is a flowchart illustrating a sequence of a scheduling operation using a cumulative weight, the scheduling operation including a suspending operation and a resuming operation using a cumulative weight.

The sequence of a scheduling operation when the cumulative weight is used will be explained. FIG. 16 is a flowchart illustrating the sequence of a scheduling operation including a suspending operation and a resume operation using a cumulative weight.

It is assumed herein that the second input has been selected. The controller 4 executes a program command or an erase command (Step S201). The controller 4 executes the program command or the erase command by transmitting the program command or the erase command to the NAND flash memory 5.

The controller 4 determines whether the cumulative weight (VT) is equal to or smaller than 0 (Step S202).

When the VT is greater than 0 (No in Step S202), the controller 4 determines whether the number of unexecuted read commands (RinQ) has reached the minimum read count (MNVT) (Step S203). The controller 4 may also manage the sum of the weights associated with the read commands stored in the command queue 61 as RinQ.

When RinQ has not reached the MNVT, that is, if the first suspend condition is not satisfied (No in Step S203), the controller 4 determines whether the second suspend condition is satisfied, that is, determines whether there is one or more unexecuted read commands and the time elapsed from when the program operation or the erase operation is started or resumed has reached the maximum suspend interval (MXSI) (Step S204).

When the VT is equal to or smaller than 0 (Yes in Step S202), or if both the first suspend condition and the second suspend condition are not satisfied (No in Step S204), the controller 4 continues the program operation or the erase operation being executed (Step S205).

The controller 4 then determines whether the program operation or the erase operation being executed has been completed (Step S206).

When the program operation or the erase operation being executed has been completed (Yes in Step S206), the controller 4 ends the scheduling operation for determining whether to execute the operation for suspending the program operation or the erase operation.

When the program operation or the erase operation being executed has not completed yet (No in Step S206), the controller 4 returns to Step S202. The controller 4 then determines again whether to execute the operation for suspending the program operation or the erase operation being executed.

When the VT is equal to or greater than 0 (No in Step S202) and RinQ has reached the MNVT (Yes in Step S203), or when the VT is equal to or greater than 0 (No in Step S202), there are one or more unexecuted read commands, and the elapsed time has reached the MXSI (Yes in Step S204), the controller 4 suspends the program operation or the erase operation being executed (Step S207). The controller 4 transmits a suspend command to the NAND flash memory 5.

The controller 4 then executes a read command (Step S208). In response to the execution of the read command, the controller 4 updates RinQ and the number of read commands (VTPS) executed during this suspension.

The controller 4 then determines whether the VT is equal to or smaller than 0 (S209).

When the VT is greater than 0 (No in Step S209), the controller 4 determines whether there is one or more unexecuted read commands (Step S210).

When there is one or more unexecuted read commands (Yes in Step S210), the controller 4 determines whether the VTPS has reached the maximum cumulative read count (MXVTPS) (Step S211).

When the VTPS has not reached the MXVTPS (No in Step S211), the controller 4 further executes the next read command stored in the command queue 61 (Step S208).

When the VT is equal to or smaller than 0 (Yes in Step S209), when there is no unexecuted read command (No in Step S210), or when the VTPS has reached the MXVTPS (Yes in Step S211), the controller 4 resumes the suspended program operation or erase operation (Step S212). The controller 4 issues a resume command for resuming the program operation or the erase operation suspended in Step S106 to the NAND flash memory 5.

The controller 4 then determines whether the program operation or the erase operation being executed has been completed (Step S206).

As described above, in this embodiment, the controller 4 can select a command to be sent to the NAND flash memory 5 flexibly, in accordance with the condition of the flash storage device 1. Specifically, the controller 4 controls suspensions and resumptions of erase/program commands by managing the number of unexecuted read commands (RinQ) stored in the command queue 61, the elapsed time (T) from when the execution of the program command or the erase command is started or resumed, and the number of read commands (VTPS) executed during a suspension.

When RinQ is equal to or greater than the MNVT, the controller 4 suspends the erase/program command being executed, so that the controller 4 can execute the read commands in a number equal to or greater than the MNVT during one suspension of the erase/program command. In this manner, a variation in the latency of the read commands can be reduced.

When the number of read commands (VTPS) executed during a suspension reaches the MXVTPS (>MNVT), the controller 4 resumes the execution of the erase/program command having been suspended. As a result, it is possible to set an upper limit value to the number of read commands executed during one suspension. Note that, in the NAND flash memory 5, when an upper limit value is set to the number of read commands that can be executed during a suspension or the sum of the weights of the read commands that can be executed during a suspension, as a physical constraint, the controller 4 uses a smaller one of the MXVTPS and the upper limit value defined in the NAND flash memory 5, as the upper limit value of the number of read commands executed during one suspension.

In addition, by suspending the erase/program command being executed even when RinQ is equal to or greater than 1 and the elapsed time T has reached the MXSI, the controller 4 can suppress an increase in the latencies of the read commands even when the number of unexecuted read commands is smaller than the MNVT.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system connectable to a host, comprising:
a nonvolatile memory; and
a controller electrically connected to the nonvolatile memory and configured to receive a first command group including a read command to be sent to the nonvolatile memory, and a second command group including at least one of an erase command to be sent to the nonvolatile memory and a program command to be sent to the nonvolatile memory, select a command group from the first command group and the second command group, and start executing a command included in the selected command group, wherein
the controller is configured to:
when the first command group is selected, transmit the read command to the nonvolatile memory;
when the second command group is selected, transmit the erase command or the program command to the nonvolatile memory;
when a command being executed in the nonvolatile memory is the erase command or the program command and either a first condition or a second condition is satisfied, suspend an execution of the erase command or the program command by transmitting a suspend command to the nonvolatile memory, the first condition being that either the number of read commands included in the first command group or a sum of weights associated with the read commands included in the first command group is equal to or greater than a first value, the second condition being that one or more read commands are included in the first command group and a time elapsed from when an execution of the erase command or the program command is started or resumed becomes equal to or greater than a second value; and
resume the execution of the suspended erase command or the suspended program command after repeating an operation of starting an execution of a read command included in the first command group until: there is no more read command in the first command group or either the number of read commands executed during the suspension triggered by the suspend command or a sum of the weights associated with the read commands executed during the suspension becomes equal to or greater than a third value, wherein
the controller is configured to:
when a cumulative weight of weights each associated with a command started to be executed in the nonvolatile memory is greater than an initial value, execute the read command in the first command group by selecting the first command group at a higher priority than the second command group, and subtract a weight associated with the read command from the cumulative weight when executing the read command;
when the cumulative weight is smaller than the initial value, execute the erase command or the program command in the second command group by selecting the second command group at a higher priority than the first command group, and add a weight associated with the erase command or the program command to the cumulative weight when executing the erase command or the program command is executed;
when the command being executed in the nonvolatile memory is the erase command or the program command, the cumulative weight is greater than the initial value, and either the first condition or the second condition is satisfied, suspend the execution of the erase command or the program command by transmitting the suspend command to the nonvolatile memory; and
resume the execution of the erase command or the program command being suspended, after repeating an operation of starting an execution of a read command included in the first command group until: the cumulative weight becomes equal to or smaller than the initial value; there is no more read command in the first command group; or the number of read commands executed during the suspension of the erase command or the program command, or a sum of weights associated with the read commands executed during the suspension becomes equal to or greater than the third value.

2. The memory system according to claim 1, wherein the controller is configured to:
when an upper limit value is defined for the number of read commands that are executable during the suspension as a physical constraint of the nonvolatile memory, and when a value relating to the number of read commands that are executable during the suspension is specified by the host,
use a smaller one of the value specified by the host and the upper limit value defined as the physical constraint of the nonvolatile memory, as the third value.

3. The memory system according to claim 1, wherein, when an upper limit value is defined for the number of suspensions permitted during an execution of one erase command or one program command, or a total suspension time permitted during the execution of the one erase command or the one program command, in the nonvolatile memory,
the controller is configured to continue an execution of an erase command or a program command without suspending the execution of the erase command or the program command, regardless of the first condition and the second condition, after the number of suspensions or the total suspension time for the erase command or the program command become the upper limit value.

4. The memory system according to claim 1, wherein, when an interval time is defined in the nonvolatile memory, the interval time being a period that is to be ensured between from when an execution of an erase command or a program command is started or resumed to when a next suspension is started,
the controller is configured to continue an execution of an erase command or a program command without suspending the execution of the erase command or the program command, regardless of the first condition and the second condition, while a time elapsed from the execution of the erase command or the program command is started or resumed is shorter than the interval time.

5. The memory system according to claim 1, wherein the controller is configured to:
manage a command queue capable of storing one or more read commands to be sent to the nonvolatile memory;
when the cumulative weight is greater than the initial value, set an upper limit of the number of read commands storable in the command queue to a number proportional to the cumulative weight; and
when the cumulative weight is equal to or smaller than the initial value, set the upper limit of the number of read commands storable in the command queue to 1.

6. The memory system according to claim 1, wherein the nonvolatile memory is configured to execute a read command, an erase command, and a program command, and a time required in executing the read command is shorter than a time required in executing the erase command, and the time required in executing the read command is shorter than a time required in executing the program command.

7. A memory system connectable to a host, comprising:
a nonvolatile memory; and
a controller electrically connected to the nonvolatile memory and configured to receive a first command group including a read command to be sent to the nonvolatile memory, and a second command group including at least one of an erase command to be sent to the nonvolatile memory and a program command to be sent to the nonvolatile memory, select a command group from the first command group and the second command group, and start executing a command included in the selected command group, wherein
the controller is configured to:
when the first command group is selected, transmit the read command to the nonvolatile memory;
when the second command group is selected, transmit the erase command or the program command to the nonvolatile memory;
when a command being executed in the nonvolatile memory is the erase command or the program command and either a first condition or a second condition is satisfied, suspend an execution of the erase command or the program command by transmitting a suspend command to the nonvolatile memory, the first condition being that either the number of read commands included in the first command group or a sum of weights associated with the read commands included in the first command group is equal to or greater than a first value, the second condition being that one or more read commands are included in the first command group and a time elapsed from when an execution of the erase command or the program command is started or resumed becomes equal to or greater than a second value; and
resume the execution of the suspended erase command or the suspended program command after repeating an operation of starting an execution of a read command included in the first command group until: there is no more read command in the first command group or either the number of read commands executed during the suspension triggered by the suspend command or a sum of the weights associated with the read commands executed during the suspension becomes equal to or greater than a third value, wherein
the controller is configured to:
when a cumulative weight of weights each associated with a command started to be executed in the nonvolatile memory is smaller than an initial value, execute a read command in the first command group by selecting the first command group at a higher priority than the second command group, and add a weight associated with the read command to the cumulative weight when executing the read command;
when the cumulative weight is greater than the initial value, execute an erase command or a program command in the second command group by selecting the second command group at a higher priority than the first command group, and subtract a weight associated with the erase command or the program command from the cumulative weight when executing the erase command or the program command;
when the command being executed in the nonvolatile memory is an erase command or a program command, the cumulative weight is smaller than the initial value, and either the first condition or the second condition is satisfied, suspend the execution of the erase command or the program command by transmitting a suspend command to the nonvolatile memory; and
resume the execution of the suspended erase command or the suspended program command after repeating an operation of starting an execution of a read command included in the first command group until:

the cumulative weight becomes equal to or greater than the initial value; there is no more read command in the first command group; or the number of read commands executed during the suspension of the erase command or the program command, or a sum of weights associated with the read commands executed during the suspension becomes equal to or greater than the third value.

8. The memory system according to claim 7, wherein the controller is configured to:
when an upper limit value is defined for the number of read commands that are executable during the suspension as a physical constraint of the nonvolatile memory, and when a value relating to the number of read commands that are executable during the suspension is specified by the host,
use a smaller one of the value specified by the host and the upper limit value defined as the physical constraint of the nonvolatile memory, as the third value.

9. The memory system according to claim 7, wherein, when an upper limit value is defined for the number of suspensions permitted during an execution of one erase command or one program command, or a total suspension time permitted during the execution of the one erase command or the one program command, in the nonvolatile memory,
the controller is configured to continue an execution of an erase command or a program command without suspending the execution of the erase command or the program command, regardless of the first condition and the second condition, after the number of suspensions or the total suspension time for the erase command or the program command become the upper limit value.

10. The memory system according to claim 7, wherein, when an interval time is defined in the nonvolatile memory, the interval time being a period that is to be ensured between from when an execution of an erase command or a program command is started or resumed to when a next suspension is started,
the controller is configured to continue an execution of an erase command or a program command without suspending the execution of the erase command or the program command, regardless of the first condition and the second condition, while a time elapsed from the execution of the erase command or the program command is started or resumed is shorter than the interval time.

11. The memory system according to claim 7, wherein the controller is configured to:
manage a command queue capable of storing one or more read commands to be sent to the nonvolatile memory;
when the cumulative weight is smaller than the initial value, set an upper limit of the number of read commands storable in the command queue to a number proportional to the cumulative weight; and
when the cumulative weight is equal to or greater than the initial value, set the upper limit of the number of read commands storable in the command queue to 1.

12. The memory system according to claim 7, wherein the nonvolatile memory is configured to execute a read command, an erase command, and a program command, and a time required in executing the read command is shorter than a time required in executing the erase command, and the time required in executing the read command is shorter than a time required in executing the program command.

13. A memory system connectable to a host, comprising:
a nonvolatile memory; and
a controller electrically connected to the nonvolatile memory and configured to:
manage a cumulative weight of weights each associated with a command started to be executed in the nonvolatile memory;
determine, based on the cumulative weight, which of a first command group or a second command group is to be selected for transmitting a command to the nonvolatile memory, the first command group including a read command, and the second command group including an erase command or a program command;
when the cumulative weight indicates that the first command group is to be selected, transmit the read command to the nonvolatile memory; and
when the cumulative weight indicates that the second command group is to be selected, transmit the erase command or the program command to the nonvolatile memory, wherein
the controller is further configured to:
when the erase command or the program command is being executed in the nonvolatile memory, determine whether the cumulative weight indicates that the first command group is to be selected; and
in response to determining that the cumulative weight indicates that the first command group is to be selected while the erase command or the program command is being executed in the nonvolatile memory, suspend the execution of the erase command or the program command by transmitting a suspend command to the nonvolatile memory.

14. The memory system according to claim 13, wherein the controller is further configured to:
during the suspension of the erase command or the program command, transmit a plurality of read commands to the nonvolatile memory;
determine whether the cumulative weight has changed to indicate that the second command group is to be selected during the suspension of the erase command or the program command; and
in response to determining that the cumulative weight has changed to indicate that the second command group is to be selected during the suspension of the erase command or the program command, resume the suspended erase command or the suspended program command.

15. The memory system according to claim 13, wherein the controller is configured to:
when the read command is started to be executed in the nonvolatile memory, decrease the cumulative weight by the weight associated with the read command; and
when the erase command or the program command is started to be executed in the nonvolatile memory, increase the cumulative weight by the weight associated with the erase command or by the weight associated with the program command, and
the cumulative weight larger than a first threshold indicates that the first command group is to be selected, and
the cumulative weight smaller than the first threshold indicates that the second command group is to be selected.

16. The memory system according to claim 15, wherein the controller is further configured to:
- during the suspension of the erase command or the program command, transmit a plurality of read commands to the nonvolatile memory;
- determine whether the cumulative weight has decreased to be smaller than the first threshold during the suspension of the erase command or the program command; and
- in response to determining that the cumulative weight has decreased to be smaller than the first threshold during the suspension of the erase command or the program command, resume the suspended erase command or the suspended program command.

17. The memory system according to claim 13, wherein the controller is configured to:
- when the read command is started to be executed in the nonvolatile memory, increase the cumulative weight by the weight associated with the read command; and
- when the erase command or the program command is started to be executed in the nonvolatile memory, decrease the cumulative weight by the weight associated with the erase command or by the weight associated with the program command, and
- the cumulative weight smaller than a first threshold indicates that the first command group is to be selected, and
- the cumulative weight larger than the first threshold indicates that the second command group is to be selected.

18. The memory system according to claim 17, wherein the controller is further configured to:
- during the suspension of the erase command or the program command, transmit a plurality of read commands to the nonvolatile memory;
- determine whether the cumulative weight has increased to be larger than the first threshold during the suspension of the erase command or the program command; and
- in response to determining that the cumulative weight has increased to be larger than the first threshold during the suspension of the erase command or the program command, resume the suspended erase command or the suspended program command.

19. The memory system according to claim 13, wherein the weight associated with the read command is smaller than the weight associated with the erase command, and
the weight associated with the read command is smaller than the weight associated with the program command.

20. The memory system according to claim 13, wherein the nonvolatile memory includes a plurality of memory dies, and
the controller is configured to manage the cumulative weight for each of the plurality of memory dies.

* * * * *